(12) United States Patent
Kim et al.

(10) Patent No.: US 12,278,705 B2
(45) Date of Patent: Apr. 15, 2025

(54) METHOD AND APPARATUS FOR TRANSMITTING AND RECEIVING BLOCK ACK IN WIRELESS LAN SYSTEM

(71) Applicants: HYUNDAI MOTOR COMPANY, Seoul (KR); KIA CORPORATION, Seoul (KR); KOREA NATIONAL UNIVERSITY OF TRANSPORTATION INDUSTRY-ACADEMIC COOPERATION FOUNDATION, Chungju-si (KR)

(72) Inventors: Yong Ho Kim, Incheon (KR); Yong Su Gwak, Seoul (KR)

(73) Assignees: HYUNDAI MOTOR COMPANY, Seoul (KR); KIA CORPORATION, Seoul (KR); KOREA NATIONAL UNIVERSITY OF TRANSPORTATION INDUSTRY—ACADEMIC COOPERATION FOUNDATION, Chungju-si (KR)

(*) Notice: Subject to any disclaimer, the term of this patent is extended or adjusted under 35 U.S.C. 154(b) by 409 days.

(21) Appl. No.: 17/774,096

(22) PCT Filed: Nov. 3, 2020

(86) PCT No.: PCT/KR2020/015246
§ 371 (c)(1),
(2) Date: May 3, 2022

(87) PCT Pub. No.: WO2021/091199
PCT Pub. Date: May 14, 2021

(65) Prior Publication Data
US 2022/0407622 A1    Dec. 22, 2022

(30) Foreign Application Priority Data

Nov. 4, 2019 (KR) .......................... 10-2019-0139686
Jan. 2, 2020 (KR) .......................... 10-2020-0000408

(51) Int. Cl.
*H04L 1/16* (2023.01)
*H04W 84/12* (2009.01)

(52) U.S. Cl.
CPC ............... *H04L 1/16* (2013.01); *H04W 84/12* (2013.01)

(58) Field of Classification Search
CPC ....... H04L 1/16; H04L 1/1614; H04L 1/1896; H04L 1/1685; H04L 5/0055; H04L 1/1864; H04W 84/12; H04B 7/2612
See application file for complete search history.

(56) References Cited

U.S. PATENT DOCUMENTS 9,226,102 B1    12/2015  Singh et al.
10,225,061 B2*  3/2019   Kim ..................... H04L 1/1864
(Continued)

FOREIGN PATENT DOCUMENTS

KR       100567821 B1 *  4/2006
KR       20180041778 A   4/2018
(Continued)

OTHER PUBLICATIONS

International Search Report and Written Opinion cited in corresponding application No. PCT/KR2020/015246; Jan. 29, 2021; 13pp.
(Continued)

*Primary Examiner* — Ayaz R Sheikh
*Assistant Examiner* — Louis Samara
(74) *Attorney, Agent, or Firm* — Lempia Summerfield Katz LLC

(57) ABSTRACT

A method and apparatus for transmitting and receiving a block acknowledgement (ACK) in a wireless local area
(Continued)

network (LAN) system are disclosed. An operation method for a first communication node comprises the steps of: generating a first data frame including first add block acknowledgment (ADDBA) information; transmitting the first data frame to a second communication node; and receiving, from the second communication node, a first receiver address (RA) including second ADDBA information generated by the second communication node in response to the first data frame.

17 Claims, 23 Drawing Sheets

(56) References Cited

U.S. PATENT DOCUMENTS

| | | | |
|---|---|---|---|
| 10,476,648 B2 * | 11/2019 | Kim | H04L 5/0055 |
| 10,491,355 B2 | 11/2019 | Ahn et al. | |
| 11,095,416 B2 | 8/2021 | Ahn et al. | |
| 11,228,409 B2 | 1/2022 | Chitrakar et al. | |
| 2017/0331587 A1 * | 11/2017 | Kim | H04L 1/16 |
| 2018/0034595 A1 * | 2/2018 | Kim | H04L 1/1685 |
| 2018/0351725 A1 | 12/2018 | Kim et al. | |
| 2019/0132107 A1 | 5/2019 | Ahn et al. | |
| 2019/0268099 A1 * | 8/2019 | Chu | H04B 7/2612 |
| 2019/0288798 A1 * | 9/2019 | Jiang | H04L 1/1621 |
| 2020/0052860 A1 | 2/2020 | Ahn et al. | |
| 2020/0322105 A1 | 10/2020 | Chitrakar et al. | |
| 2020/0351059 A1 | 11/2020 | Ahn et al. | |
| 2024/0014938 A1 * | 1/2024 | Chu | H04B 7/2612 |

FOREIGN PATENT DOCUMENTS

| | | |
|---|---|---|
| KR | 20190032286 A | 3/2019 |
| WO | 2016085613 A1 | 6/2016 |
| WO | 2018009012 A1 | 1/2018 |
| WO | WO-2020238812 A1 * 12/2020 | H04L 1/1614 |

OTHER PUBLICATIONS

Kaoutar Abdelalim et al., Adaptive Negotiation for Block Acknowledgment Session Management, 2019 IEEE 89th Vehicular Technology Conference (VTC2019-Spring); 6pp.

* cited by examiner

FIG. 9

| MPDU #1 | MPDU #2 | MPDU #3 | MPDU #4 | MPDU #5 | MPDU #6 |
|---|---|---|---|---|---|
| 100000 | 010000 | 001000 | 000100 | 000010 | 000001 |
| 000001 | 000010 | 000011 | 000100 | 000101 | 000110 | sequence number bitmap
sequence number bitmap

[reception failure of data frame]

METHOD AND APPARATUS FOR TRANSMITTING AND RECEIVING BLOCK ACK IN WIRELESS LAN SYSTEM

CROSS-REFERENCE TO RELATED APPLICATIONS

This application is a U.S. national stage of International Application No. PCT/KR2020/015246, filed on Nov. 3, 2020, which claims priority to Korean Patent Application No. 10-2019-0139686, filed on Nov. 4, 2019, and Korean Patent Application No. 10-2020-0000408, filed on Jan. 2, 2020, the entire contents of which are incorporated herein by reference.

TECHNICAL FIELD

The present disclosure relates to a wireless local area network (LAN) communication technique, and more particularly, to a technique for transmitting and receiving acknowledgment (ACK) (e.g., block ACK) informing a reception status of a frame in a vehicle wireless LAN system.

BACKGROUND ART

As the information age advances, wireless local area network (LAN) technology is receiving a lot of attention. The wireless LAN technology may be a technology for connecting two or more devices by applying an orthogonal frequency division multiplex (OFDM) technology. Users can continuously access a network while moving at any time from home or office by using the wireless LAN technology. The wireless LAN technology may support Institute of Electrical and Electronics Engineers (IEEE) 802.11 standards. The wireless LAN technology is well known under the marketing name of Wi-Fi. In particular, large-capacity data should be processed in real-time to implement artificial intelligence technology and autonomous driving technology, which are core technologies in the era of the 4th industrial revolution. Accordingly, the wireless LAN technology, which is cheaper to operate than cellular communication, is receiving more attention, and a lot of research on the wireless LAN technology is in progress.

An early version of the IEEE 802.11 standards may support a communication speed of 1 to 2 megabits per second (Mbps). Here, a 2.4 GHz frequency band may be used, and a frequency hopping technique, a bandwidth spreading technique, an infrared communication technique, and the like may be applied. Subsequent versions of the IEEE 802.11 standards are being standardized in the direction of improving communication speed. For example, a communication speed of up to 54 Mbps may be supported. In addition, various technologies such as Quality of Service (QoS) enhancement, access point (AP) protocol compatibility, security enhancement, radio resource measurement, wireless access vehicular environment (WAVE), fast roaming, mesh network, interworking with external networks, and wireless network management are being developed.

The IEEE 802.11a/b/g/n/ac/ad standards are commercially available. The IEEE 802.11b standard may support a communication speed of up to 11 Mbps using the 2.4 GHz frequency band. The IEEE 802.11a standard may use a 5 GHz frequency band instead of the 2.4 GHz frequency band and may support a communication speed of up to 54 Mbps by applying the OFDM technology. Due to propagation characteristics of the 5 GHz frequency band (e.g., high straightness and low diffraction performance), the communication distance of the IEEE 802.11a standard may be shorter than that of the IEEE 802.11b standard.

The IEEE 802.11g standard may use the 2.4 GHz frequency band similarly to the IEEE 802.11b standard. The IEEE 802.11g standard may support a communication speed of up to 54 Mbps and may have backward compatibility with the IEEE 802.11b standard.

The IEEE 802.11n standard was developed to overcome the limit of communication speed. According to the IEEE 802.11n standard, communication speed and reliability can be improved, and communication distance can be increased. The IEEE 802.11n standard may support a communication speed of up to 540 Mbps by using the OFDM technology and Multiple Inputs and Multiple Outputs (MIMO) technology. That is, the IEEE 802.11n standard may support High Throughput (HT). The IEEE 802.11n standard may support duplicated transmission to improve communication reliability.

The IEEE 802.11ac standard may support Very High Throughput (VHT). The IEEE 802.11ac standard may use the 5 GHz frequency band as well as the 2.4 GHz frequency band and may use a wide bandwidth (e.g., 80 MHz to 160 MHz) to support a high data throughput. The IEEE 802.11ac standard may have backward compatibility with the existing wireless LAN standards. The IEEE 802.11ac standard may support a communication speed of at least 1 Gbps using multiple links and may support a communication speed of at least 500 Mbps using a single link. The above-described communication speed may be provided using a wide bandwidth (e.g., up to 160 MHz), many spatial streams (e.g., up to 8 spatial streams), multi user (MU)-MIMO, higher-order modulation technology (e.g., up to 256 quadrature amplitude modulation (QAM)), and the like.

The IEEE 802.11ad standard may transmit data using a 60 GHz frequency band instead of the 2.5 GHz/5 GHz frequency band. The IEEE 802.11ad standard may support a communication speed of up to 7 Gbps using beamforming technology. The IEEE 802.11ad standard may be used for large-capacity data transmission, uncompressed high definition (HD) video transmission, streaming video having a high bit rate, and the like. However, the IEEE 802.11ad standard may be used for short-distance communication due to propagation characteristics (e.g., high straightness and low diffraction performance) of the 60 GHz frequency band.

The IEEE 802.11p standard was developed for Intelligent Transport System (ITS) communication. The IEEE 802.11p standard may use a physical layer technology of the IEEE 802.11a standard and a medium access control (MAC) technology (e.g., enhanced distributed channel access (EDCA)) of the IEEE 802.11e standard. In the IEEE 802.11p standard, a bandwidth of a channel may be 10 MHz, and the channel may be classified according to an application. The communication speed of the IEEE 802.11p standard supporting 10 MHz bandwidth may be slower than the communication speeds of other wireless LAN standards supporting 20 MHz bandwidth. In other words, in the IEEE 802.11p standard, the channel capacity may be relatively small. In the IEEE 802.11p standard, a basic service set (BSS) may not be configured. Accordingly, a terminal may transmit/receive data without association with an access point based on 'outside context of BSS (OCB)' technology.

The IEEE 802.11bd standard may be a later version of the IEEE 802.11p standard. For a unicast OCB technology, aggregated-MAC service data unit (A-MSDU) transmission and aggregated-MAC protocol data unit (A-MPDU) transmission may be supported.

Meanwhile, the technologies noted in the background art section of the present disclosure are described to improve the understanding of the background of the inventive concept. Thus, the background art section may include content that is not already known to those of ordinary skill in the art to which the present disclosure belongs.

DISCLOSURE

Technical Problem

The present disclosure is directed to providing a method and an apparatus for transmitting and receiving a block ACK in a vehicle wireless LAN system.

Technical Solution

An operation method of a first communication node, according to a first embodiment of the present disclosure for achieving the above-described objective, may comprise: generating a first data frame including first add block acknowledgment (ADDBA) information; transmitting the first data frame to a second communication node; and receiving, from the second communication node, a first block acknowledgment (BA) including second ADDBA information generated by the second communication node in response to the first data frame. A transmission/reception operation of the first data frame is performed without a BA agreement operation between the first communication node and the second communication node.

The first ADDBA information may include at least one of information indicating a BA timeout value, information indicating a buffer size, information indicating a fragment number, information indicating a starting sequence number, information of a sequence number bitmap, or a combination thereof.

The buffer size may indicate a maximum number of medium access control (MAC) protocol data units (MPDUs) transmittable in a BA session started by the first data frame.

The second ADDBA information may include at least one of information indicating a BA timeout value, information indicating a buffer size, or a combination thereof.

The first data frame may include one or more MPDUs, and a number of the one or more MPDUs may be determined in consideration of a buffer size of the second communication node.

When the first data frame includes a plurality of MPDUs, the first ADDBA information may be included in a first MPDU among the plurality of MPDUs.

The operation method may further comprise receiving, from the second communication node, a frame including information indicating a buffer size of the second communication node before transmitting the first data frame. A number of one or more MPDUs included in the first data frame is determined based on the buffer size.

The operation method may further comprise: transmitting, to the second communication node, a second data frame not including the first ADDBA information in a same BA session as the first data frame; and receiving, from the second communication node, a second BA not including the second ADDBA information in response to the second data frame.

A number of one or more MPDUs included in the second data frame may be determined based on a buffer size determined through exchanging of the first data frame and the first BA.

An operation method of a second communication node, according to a second embodiment of the present disclosure for achieving the above-described objective, may comprise: receiving, from a first communication node, a first data frame including first add block acknowledgment (ADDBA) information; generating second ADDBA information in consideration of the first ADDBA information; and transmitting, to the first communication node, a block acknowledgment (BA) including the second ADDBA information in response to the first data frame. A transmission/reception operation of the first data frame is performed without a BA agreement operation between the first communication node and the second communication node.

The first ADDBA information may include at least one of information indicating a BA timeout value, information indicating a buffer size, information indicating a fragment number, information indicating a starting sequence number, information of a sequence number bitmap, or a combination thereof.

The second ADDBA information may include at least one of information indicating a BA timeout value, information indicating a buffer size, or a combination thereof.

The first data frame may include one or more medium access control (MAC) protocol data units (MPDUs), a number of the one or more MPDUs may be determined in consideration of a buffer size of the second communication node, and the first ADDBA information may be included in a first MPDU among the plurality of MPDUs.

The operation method may further comprise transmitting a frame including information indicating a buffer size of the second communication node before receiving the first data frame. A number of one or more MPDUs included in the first data frame may be determined based on the buffer size.

The operation method may further comprise: receiving, from the first communication node, a second data frame not including the first ADDBA information in a same BA session as the first data frame; and transmitting, to the first communication node, a second BA not including the second ADDBA information in response to the second data frame.

A first communication node, according to a third embodiment of the present disclosure for achieving the above-described objective, may comprise a processor and a memory storing one or more instructions executable by the processor. The one or more instructions may be executed to: generate a first data frame including first add block acknowledgment (ADDBA) information; transmit the first data frame to a second communication node; and receive, from the second communication node, a first block acknowledgment (BA) including second ADDBA information generated by the second communication node in response to the first data frame. A transmission/reception operation of the first data frame is performed without a BA agreement operation between the first communication node and the second communication node.

The first data frame may include one or more medium access control (MAC) protocol data units (MPDUs), a number of the one or more MPDUs may be determined in consideration of a buffer size of the second communication node, and the first ADDBA information may be included in a first MPDU among the one or more MPDUs.

The one or more instructions may be further executed to receive, from the second communication node, a frame including information indicating a buffer size of the second communication node before transmitting the first data frame. A number of one or more MPDUs included in the first data frame may be determined based on the buffer size.

The one or more instructions may be further executed to: transmit, to the second communication node, a second data frame not including the first ADDBA information in a same BA session as the first data frame; and receive, from the second communication node, a second BA not including the second ADDBA information in response to the second data frame.

A number of one or more MPDUs included in the second data frame may be determined based on a buffer size determined through exchanging of the first data frame and the first BA.

Advantageous Effects

According to the present disclosure, a medium access control (MAC) protocol data unit (MPDU) having quality of service (QoS) data may be transmitted in a vehicle wireless LAN system, and a block acknowledgment (ACK) operation for the MPDU may be supported. An ACK operation for data transmitted in a broadcast scheme or a multicast scheme may be supported. Accordingly, communication reliability and stability can be improved in a communication scenario in which a channel state is changed (e.g., platooning scenario). Accordingly, the performance of the vehicle wireless LAN system can be improved.

DESCRIPTION OF DRAWINGS

FIG. 9 is a conceptual diagram illustrating a first embodiment of a sequence number bitmap.

MODE FOR INVENTION

Figure 1:
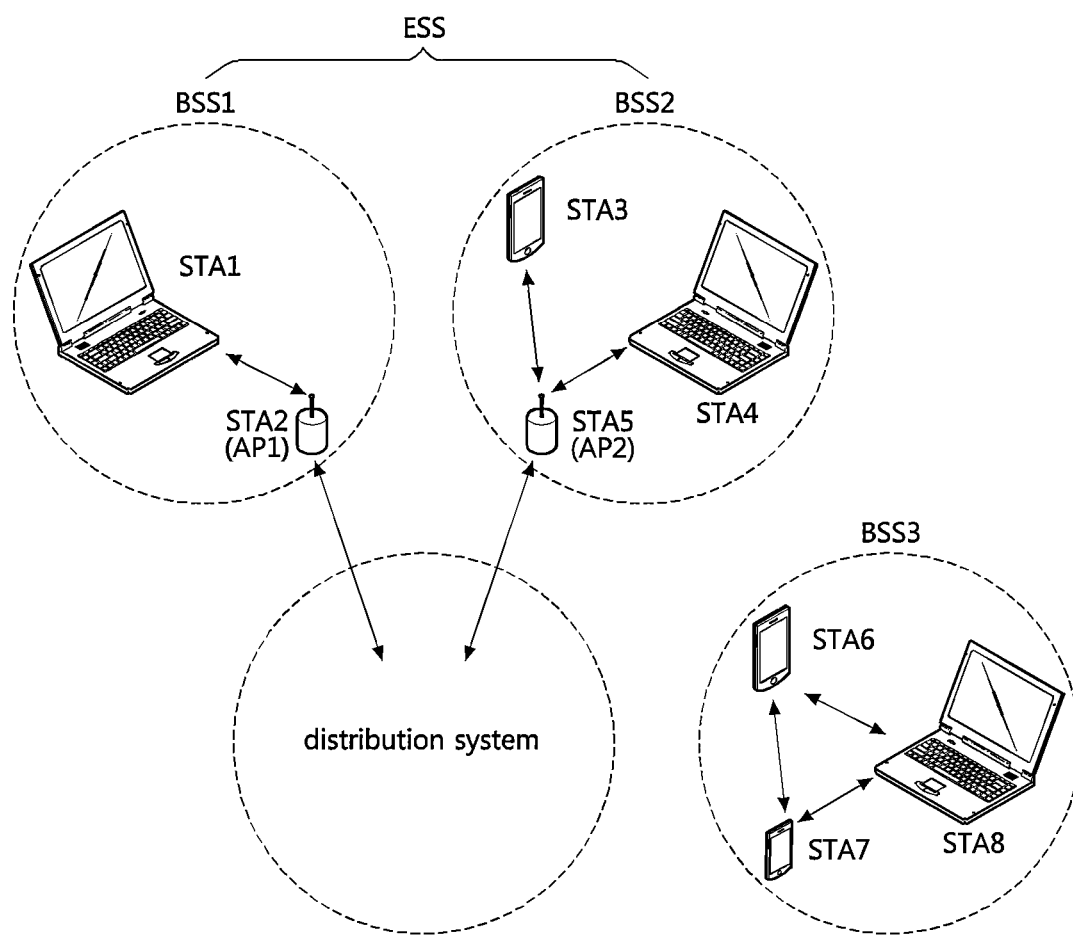
FIG. 1 is a diagram illustrating a first embodiment of a wireless local area network (WLAN) system.

Since the present disclosure may be variously modified and have several forms, specific embodiments are shown in the accompanying drawings and be described in detail in the detailed description.

It should be understood, however, that it is not intended to limit the present disclosure to the specific embodiments. On the contrary, the present disclosure is intended to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without departing from the scope of the present disclosure, and the second component may also be similarly named the first component. The term "and/or" means any one or a combination of a plurality of related and described items.

When it is mentioned that a certain component is "coupled with" or "connected with" another component, it should be understood that the certain component is directly "coupled with" or "connected with" to the other component or a further component may be disposed therebetween. In contrast, when it is mentioned that a certain component is "directly coupled with" or "directly connected with" another component, it should be understood that a further component is not disposed therebetween.

The terms used in the present disclosure are only used to describe specific embodiments and are not intended to limit the present disclosure. The singular expression includes the plural expression unless the context clearly dictates otherwise. In the present disclosure, terms such as 'comprise' or 'have' are intended to designate that a feature, number, step, operation, component, part, or combination thereof described in the specification exists. However, it should be understood that the terms do not preclude existence or addition of one or more features, numbers, steps, operations, components, parts, or combinations thereof.

Unless otherwise defined, all terms (including technical and scientific terms) used herein have the same meaning as commonly understood by one of ordinary skill in the art to which this disclosure belongs. Terms that are generally used and have been in dictionaries should be construed as having meanings matched with contextual meanings in the art. In this description, unless defined clearly, terms are not necessarily construed as having formal meanings.

Hereinafter, forms of the present disclosure are described in detail with reference to the accompanying drawings. In describing the disclosure, to facilitate the entire understanding of the disclosure, like numbers refer to like elements throughout the description of the figures and the repetitive description thereof has been omitted.

In the following, a wireless communication network to which embodiments according to the present disclosure are applied is described. The wireless communication network to which the embodiments according to the present disclosure are applied is not limited to the content described below. The embodiments according to the present disclosure may be applied to various wireless communication networks. When a component, device, element, or the like of the present disclosure is described as having a purpose or performing an operation, function, or the like, the component, device, or element should be considered herein as being "configured to" meet that purpose or to perform that operation or function.

FIG. 1 is a diagram illustrating a first embodiment of a wireless local area network (WLAN) system.

As shown in FIG. 1, a WLAN system may include at least one basic service set (BSS). The BSS denotes a set of stations (STAs) (e.g., STA1, STA2 (i.e., AP1), STA3, STA4, and STA5 (i.e., AP2), STA6, STAT, and STAB) configured to communicate with each other through successful synchronization. The BSS does not necessarily denote a specific area. In embodiments below, a station that performs a function of an access point may be referred to as an "access point (AP)", and a station that does not perform the function of an access point may be referred to as a "non-AP station" or "station".

The BSSs may be classified as infrastructure BSSs and independent BSSs (IBSSs). In particular, a BSS1 and a BSS2 may be infrastructure BSSs, and a BSS3 may be an IBSS. The BSS1 may include the station STA1, the access point STA2 (i.e., AP1) that provides a distribution service, and a distribution system (DS) that connects the plurality of access points STA2 (i.e., AP1) and STA5 (i.e., AP2). In the BSS1, the access point STA2 (i.e., AP1) may manage the STA1.

The BSS2 may include the STA3, the STA4, the access point STA5 (i.e., AP2) that provides the distribution service, and the distribution system that connects the plurality of access points STA2 (i.e., AP1) and STA5 (i.e., AP 2). In the BSS2, the access point STA5 (i.e., AP2) may manage the STA3 and the STA4.

The BSS3 may be an IBSS operating in an ad-hoc mode. In the BSS3, there is no AP that performs a management function at a center (i.e., centralized management entity). In other words, in the BSS3, the stations STA6, STA7, and STA8 may be managed in a distributed manner. In the BSS3, all the stations STA6, STA7, and STA8 may be mobile stations and may be not permitted to connect to the DS, thus forming a self-contained network.

The access points STA2 (i.e., AP1) and STA5 (i.e., AP2) may provide access to the DS via a wireless medium for the stations STA1, STA3, and STA4 connected thereto. Communications between the stations STA1, STA3, and STA4 in the BSS 1 or the BSS2 may be generally performed via the access points STA2 (i.e., AP1) and STA5 (i.e., AP2). However, when a direct link is established, direct communications between the stations STA1, STA3, and STA4 are also possible.

A plurality of infrastructure BSSs may be interconnected via a DS. A plurality of BSSs connected via a DS is referred to as an extended service set (ESS). The stations (e.g., STA1, STA2 (i.e., AP1), STA3, STA4, and STA5 (i.e., AP2)) included in an ESS may be configured to communicate with each other, and a station (e.g., STA1, STA3, or STA4) in the ESS may move from one BSS to another BSS while performing seamless communication.

The DS is a mechanism for one AP to communicate with another AP. The AP may be configured to transmit a frame for stations connected to a BSS managed by the AP or transmit a frame for an arbitrary station having moved to another BSS. Additionally, the AP may be configured to exchange frames with an external network, such as a wired network. The DS is not necessarily a network and may have any form capable of providing a predetermined distribution service defined in the IEEE 802.11 standard. For example, the DS may be a wireless network, such as a mesh network, or a physical structure that connects APs with each other. Each of the communication nodes STA1, STA2 (i.e., AP1), STA3, STA4, STA5 (i.e., AP2), STA6, STAT, and STA8 included in the WLAN system may be configured as follows.

Figure 2:
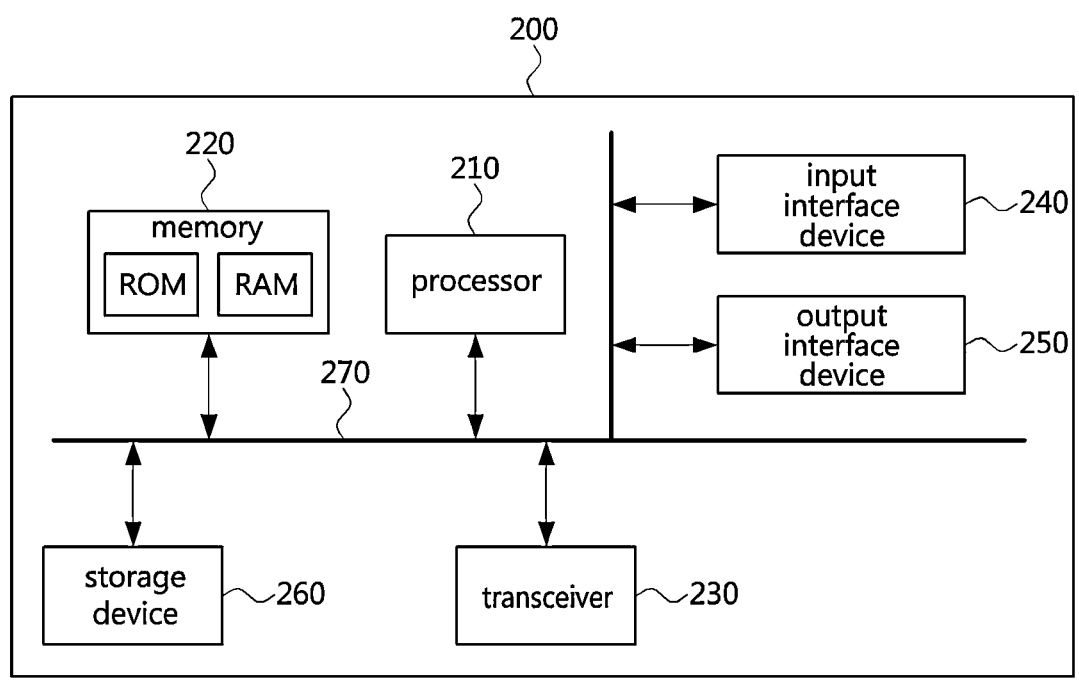
FIG. 2 is a block diagram illustrating an embodiment of a communication node configured as a WLAN system.

FIG. 2 is a block diagram illustrating an embodiment of a communication node configured as a WLAN system.

As shown in FIG. 2, a communication node 200 may include at least one processor 210, a memory 220, and a transceiver 230 connected to a network for performing communications. The transceiver 230 may also be referred to as a "radio frequency (RF) unit", "RF module", or the like. Additionally, the communication node 200 may further include an input interface device 240, an output interface device 250, a storage device 260, and the like. Each component included in the communication node 200 may be configured to communicate with each other as connected via a common bus 270.

However, each of the components included in the communication node 200 may be connected to the processor 210 via a separate interface or a separate bus rather than the common bus 270. For example, the processor 210 may be connected to at least one of the memory 220, the transceiver 230, the input interface device 240, the output interface device 250, or the storage device 260 via a dedicated interface.

The processor 210 may be configured to execute at least one instruction stored in at least one of the memory 220 or the storage device 260. The processor 210 may refer to a central processing unit (CPU), a graphics processing unit (GPU), or a dedicated processor. Methods in accordance with embodiments of the present disclosure may be performed by the processor 210. Each of the memory 220 and the storage device 260 may include at least one of a volatile storage medium or a non-volatile storage medium. For example, the memory 220 may include at least one of read-only memory (ROM) and random access memory (RAM).

Meanwhile, in the WLAN system, an association procedure may be performed as follows.

Figure 3:
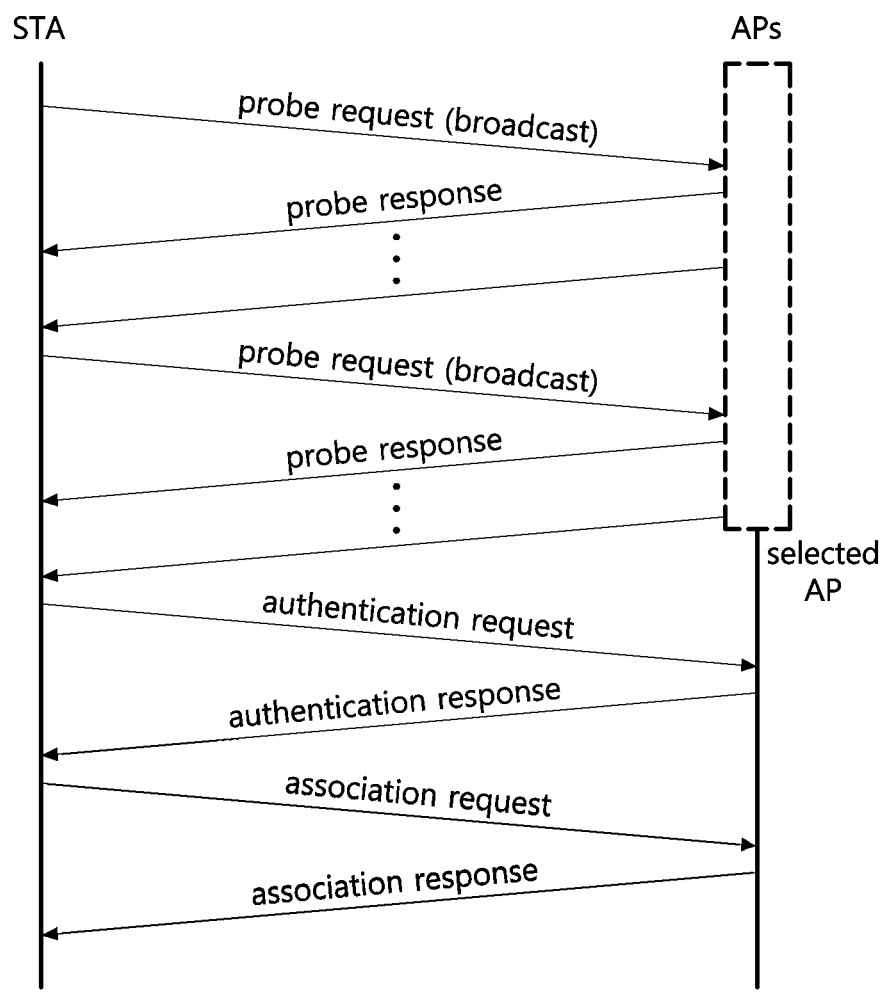
FIG. 3 is a sequence chart illustrating an association procedure of a station in a WLAN system.

FIG. 3 is a sequence chart illustrating an association procedure of a station in a WLAN system.

As shown in FIG. 3, an association procedure of a station STA in an infrastructure BSS may generally be divided into a probe step of probing an AP, an authentication step for authentication with the probed AP, and an association step of associating with the authenticated AP.

The station STA may be configured to first probe neighboring APs with a probe process. The probe process may be performed in a passive scanning scheme or an active scanning scheme. The passive scanning scheme may be performed by overhearing beacons transmitted by the neighboring APs. Additionally, the active scanning scheme may be performed by broadcasting a probe request frame. The APs receiving the probe request frame may be configured to transmit probe response frames that correspond to the probe request frame to the station STA. The station STA may be configured to recognize the presence of the neighboring APs by receiving the probe response frames.

Subsequently, the station STA may be configured to perform an authentication with a probed AP and perform an authentication with the plurality of probed APs. Authentication algorithms conforming to an IEEE 802.11 standard are classified as an open system algorithm for exchanging two authentication frames and a shared key algorithm for exchanging four authentication frames.

The station STA may be configured to complete an authentication with an AP by exchanging an authentication request frame and an authentication response frame based on the authentication algorithms according to an IEEE 802.11 standard.

When authentication with the access point (AP) is completed, the station STA may be configured to perform an association step with the access point (AP). In particular, the station STA may be configured to select one access point AP among authenticated access points APs and perform the association step with the selected access point AP. In other words, the station STA may be configured to transmit an association request frame to the selected AP and receive an association response frame that is a response to the association request frame from the selected AP. Thus, the association with the selected AP may be completed.

Meanwhile, a communication node (e.g., access point, station, etc.) belonging to the WLAN system may be configured to perform transmission and reception of a frame based on a point coordination function (PCF), a hybrid coordination function (HCF), an HCF controlled channel access (HCCA), a distributed coordination function (DCF), and/or an enhanced distributed channel access (EDCA).

The frame in the WLAN system may be classified into a management frame, a control frame, and a data frame. The management frame may be classified into an association request frame, an association response frame, a reassociation request frame, a reassociation response frame, a probe request frame, a probe response frame, and a beacon frame. Additionally, the management frame may include a disassociation frame, an authentication frame, a deauthentication frame, an action frame, and the like.

The control frame may be classified into an acknowledgment (ACK) frame, a block ACK request (BAR) frame, a block ACK (BA) frame, a power saving (PS)-Poll frame, a request-to-send (RTS) frame, a clear-to-send (CTS) frame, and the like. The data frame may be classified into a quality of service (QoS) data frame and a non-QoS data frame. The QoS data frame may be configured to indicate a data frame for transmission based on the QoS, and the non-QoS data frame may be configured to indicate a data frame for transmission not based on the QoS.

Meanwhile, in the WLAN system, a communication node (e.g., access point or station) may be configured to operate based on the EDCA.

Figure 4:
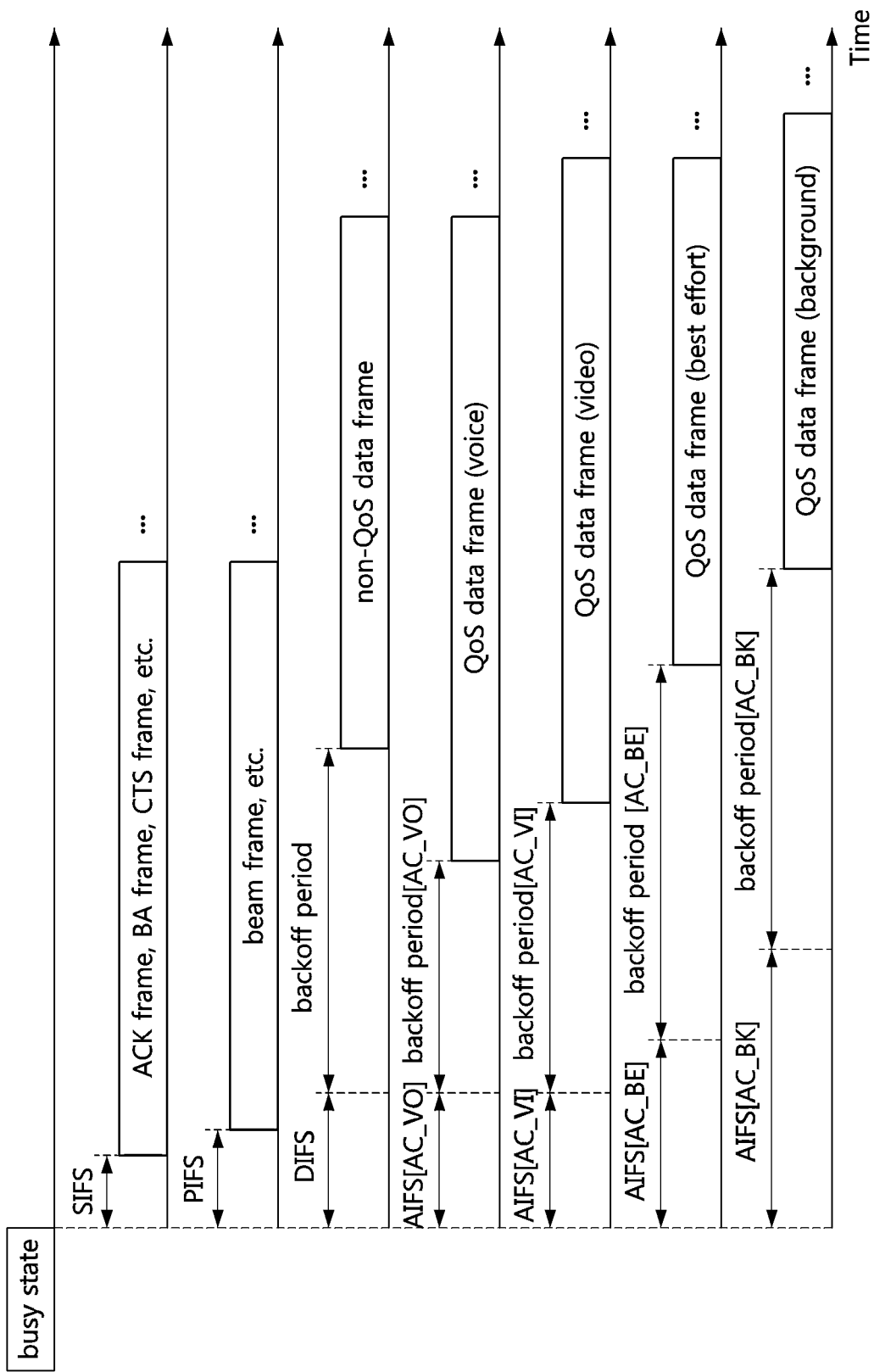
FIG. 4 is a timing diagram illustrating a first embodiment of an operation method of a communication node based on an enhanced distributed channel access (EDCA).

FIG. 4 is a timing diagram illustrating a first embodiment of an operation method of a communication node based on an EDCA.

As shown in FIG. 4, a communication node that wants to transmit a control frame (or a management frame) may be configured to perform a monitoring operation (e.g., carrier sensing operation) on a channel state during a predetermined period (e.g., a short interframe space (SIFS) or a PCF IFS (PIFS)). When the channel state is determined to be an idle state during the predetermined period (e.g., SIFS or PIFS), the communication node may be configured to transmit a control frame (or a management frame). For example, the communication node may be configured to transmit an ACK frame, a BA frame, a CTS frame, or the like when the channel state is determined to be an idle state during an SIFS. Additionally, the communication node (e.g., AP) may be configured to transmit a beacon frame or the like when the channel state is determined to be an idle state during a PIFS. When the channel state is determined to be busy during the predetermined period (e.g., SIFS or PIFS), the communication node may be configured to not transmit a control frame (or a management frame). In particular, the carrier sensing operation may be referred to as a "clear channel assessment (CCA) operation".

A communication node intending to transmit a non-QoS data frame may be configured to perform a monitoring operation (e.g., carrier sensing operation) on a channel state during a DCF IFS (DIFS). When the channel state is determined to be idle during a DIFS, the communication node may be configured to perform a random backoff procedure. For example, the communication node may be configured to select a backoff value (e.g., backoff counter) within a contention window based on the random backoff procedure and perform the monitoring operation (e.g., carrier sensing operation) during a period that corresponds to the selected backoff value. The communication node may be configured to transmit a non-QoS data frame when the channel state is determined to be an idle state during the backoff period.

A communication node intending to transmit a QoS data frame may be configured to perform a monitoring operation (e.g., carrier sensing operation) on a channel state during an arbitration IFS (AIFS). When the channel state is determined to be idle during an AIFS, the communication node may be configured to perform a random backoff procedure. The AIFS may be set based on an access category (AC) of a data unit (e.g., a protocol data unit (PDU)) included in the QoS data frame. The AC of the data unit may be as shown in Table 1 below.

TABLE 1

| Priority | AC | Description |
|---|---|---|
| Lowest | AC_BK | Background |
| . | AC_BE | Best effort |
| . | AC_VI | Video |
| . | AC_VO | Voice |
| Highest | | |

As shown in Table 1, AC_BK may indicate background data, AC_BE may indicate data transmitted in a best-effort manner, AC_VI may indicate video data, and AC_VO may indicate voice data. For example, the length of the AIFS for the QoS data frame of each of AC_VO and AC_VI may be set equal to the length of the DIFS. The length of the AIFS for the QoS data frame of AC_BE and AC_BK may be set longer than the length of the DIFS. The length of the AIFS for the QoS data frame of AC_BK may be set longer than the length of the AIFS for the QoS data frame of AC_BE.

In the random backoff procedure, the communication node may be configured to select a backoff value (e.g., backoff counter) within a contention window based on the AC of the QoS data frame. The contention window based on the AC may be as shown in Table 2 below. As shown below, CWmin may indicate the minimum value of the contention window, CWmax may indicate the maximum value of the contention window, and each of the minimum and maximum values of the contention window may be expressed by the number of slots.

TABLE 2

| AC | $CW_{min}$ | $CW_{max}$ |
|---|---|---|
| AC_BK | 31 | 1023 |
| AC_BE | 31 | 1023 |
| AC_VI | 15 | 31 |
| AC_VO | 7 | 15 |

The communication node may be configured to perform a monitoring operation (e.g., carrier sensing operation) on the channel state during a backoff period and transmit the QoS data frame when the channel state is determined to be in an idle state during the backoff period.

Hereinafter, methods for transmitting and receiving block acknowledgment (ACK) in a wireless LAN system (e.g., vehicle wireless LAN system) are described. Even when a method (e.g., transmission or reception of a signal) to be performed at a first communication node among communication nodes is described, a corresponding second communication node may be configured to perform a method (e.g., reception or transmission of the signal) corresponding to the method performed at the first communication node. In other words, when an operation of a non-AP station is described, the corresponding AP may be configured to perform an operation that corresponds to the operation of the non-AP station. Conversely, when an operation of the AP is described, the corresponding non-AP station may be configured to perform an operation that corresponds to the operation of the AP.

Figure 5:
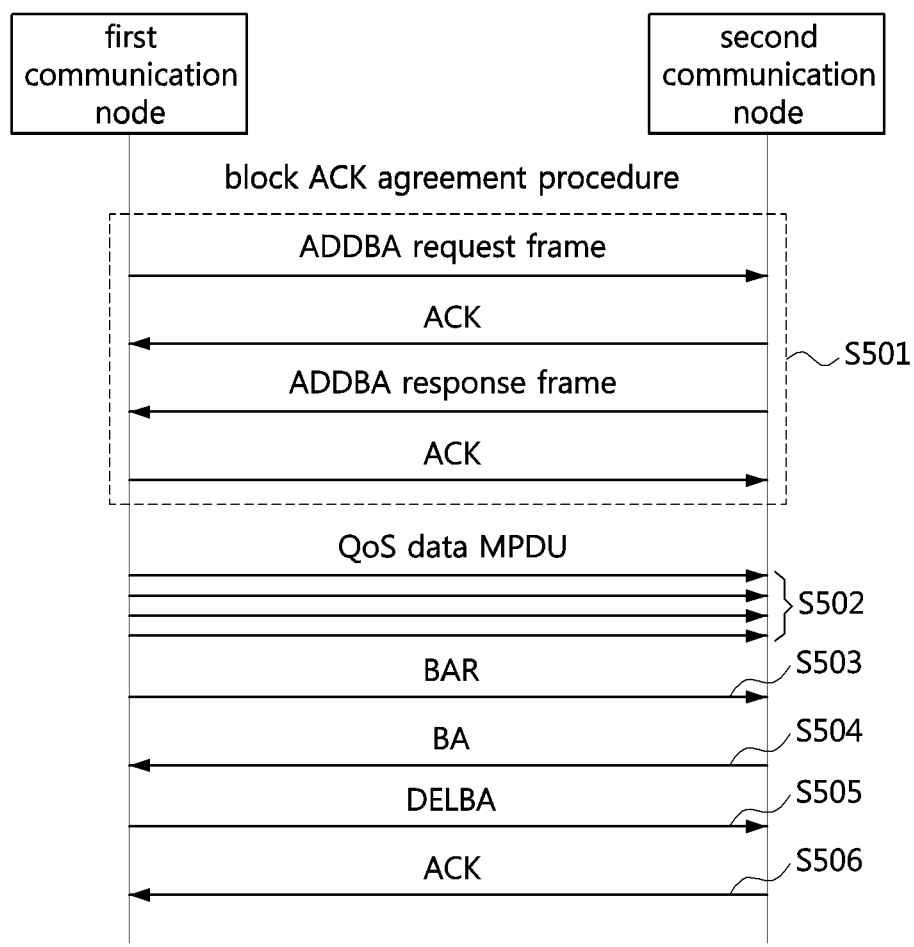
FIG. 5 is a sequence chart illustrating a first embodiment of a block acknowledgement (ACK) operation in a wireless LAN system.

FIG. 5 is a sequence chart illustrating a first embodiment of a block ACK operation in a wireless LAN system.

As shown in FIG. 5, a first communication node may transmit a quality of service (QoS) data medium access control (MAC) protocol data unit (MPDU) to a second communication node. Each of the first communication node and the second communication node may be an access point or station. The QoS data MPDU may be an MPDU including QoS data. Before transmission of the QoS data MPDU, a block ACK agreement procedure may be performed between the first communication node and the second communication node (S501). In the block ACK agreement procedure, parameters for a block ACK operation may be agreed upon. The block ACK agreement procedure may be started when the first communication node transmits an add block acknowledgment (ADDBA) request frame.

The ADDBA request frame may include a block ACK parameter set, a block ACK timeout value, block ACK starting sequence control information, and the like. Upon receiving the ADDBA request frame from the first communication node, the second communication node may transmit an ACK for the ADDBA request frame to the first communication node and then may transmit an ADDBA response frame to the first communication node. The ADDBA response frame may include a block ACK parameter set, a block ACK timeout value, and the like. Upon receiving the ADDBA response frame from the second communication node, the first communication node may transmit an ACK for the ADDBA response frame to the second communication node.

When the agreement of parameters in the block ACK agreement procedure is completed, the first communication node may transmit QoS data MPDUs to the second communication node (S502). In step S502, one aggregated (A)-MPDU including the QoS data MPDUs may be transmitted. When the transmission of the QoS data MPDUs is completed, the first communication node may transmit a block ACK request (BAR) to the second communication node (S503). The second communication node may receive the QoS data MPDUs from the first communication node. Upon receiving the BAR from the first communication node, the second communication node may transmit a block ACK (BA) for the QoS data MPDUs to the first communication node (S504). Alternatively, the BA may be transmitted without reception of the BAR.

Upon receiving the BA from the second communication node, the first communication node may transmit a delete block ACK (DELBA) to the second communication node to terminate a block ACK session (S505). The second communication node may receive the DELBA from the first communication node and may transmit an ACK for the DELBA to the first communication node (S506).

Figure 6:
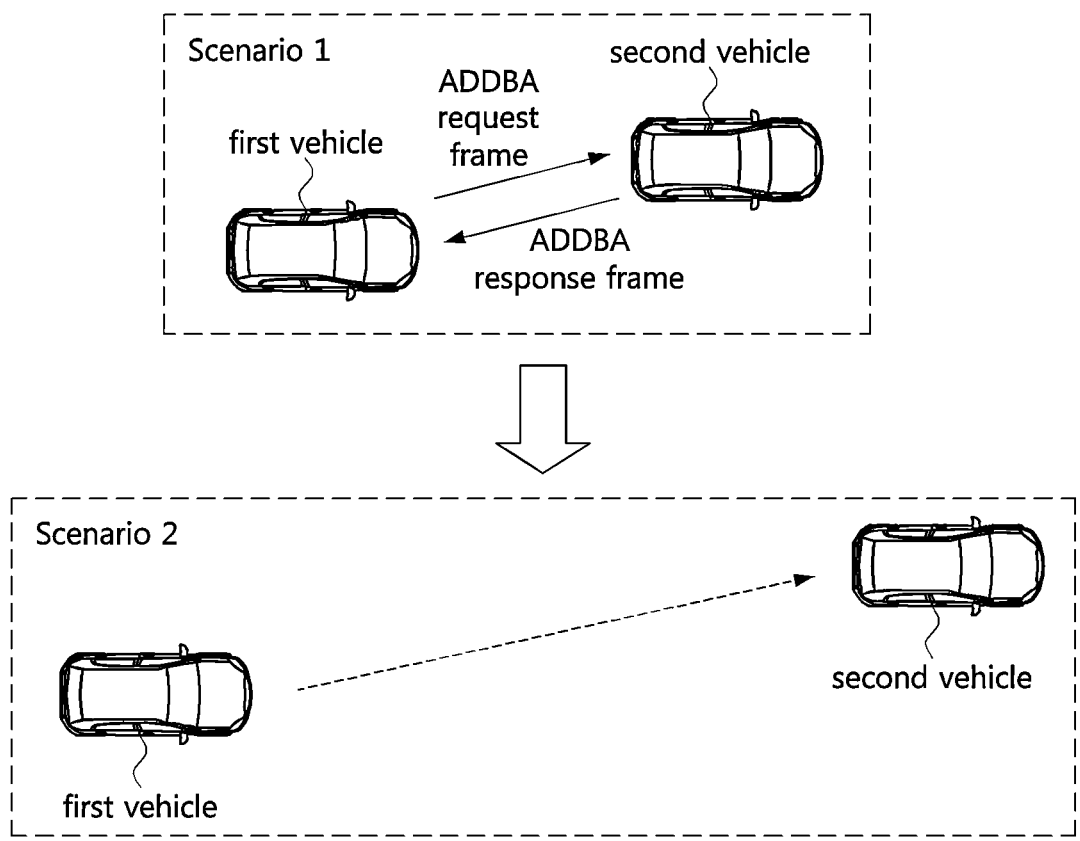
FIG. 6 is a conceptual diagram illustrating a problem that occurs when a block ACK operation is introduced into a vehicle wireless LAN system.

FIG. 6 is a conceptual diagram illustrating a problem that occurs when a block ACK operation is introduced into a vehicle wireless LAN system.

As shown in FIG. 6, in Scenario 1 (e.g., when a distance between vehicles is small), a block ACK agreement procedure may be performed for transmission of QoS data MPDUs. Meanwhile, the distance between the vehicles may increase due to a speed difference between the vehicles. This may be Scenario 2, in which the QoS data MPDUs may not be transmitted. To solve this problem, embodiments for omitting the block ACK agreement procedure are described. In order to omit the block ACK agreement procedure, a data frame (e.g., QoS data MPDU) including new field(s) may be defined. In embodiments below, a data frame may be referred to as a 'QoS data MPDU', 'A-MPDU', 'frame including QoS data MPDU(s)', or 'frame including an A-MPDU'. Also, in embodiments below, an MPDU may mean a QoS data MPDU. An A-MPDU may include one or more MPDUs.

Figure 7:
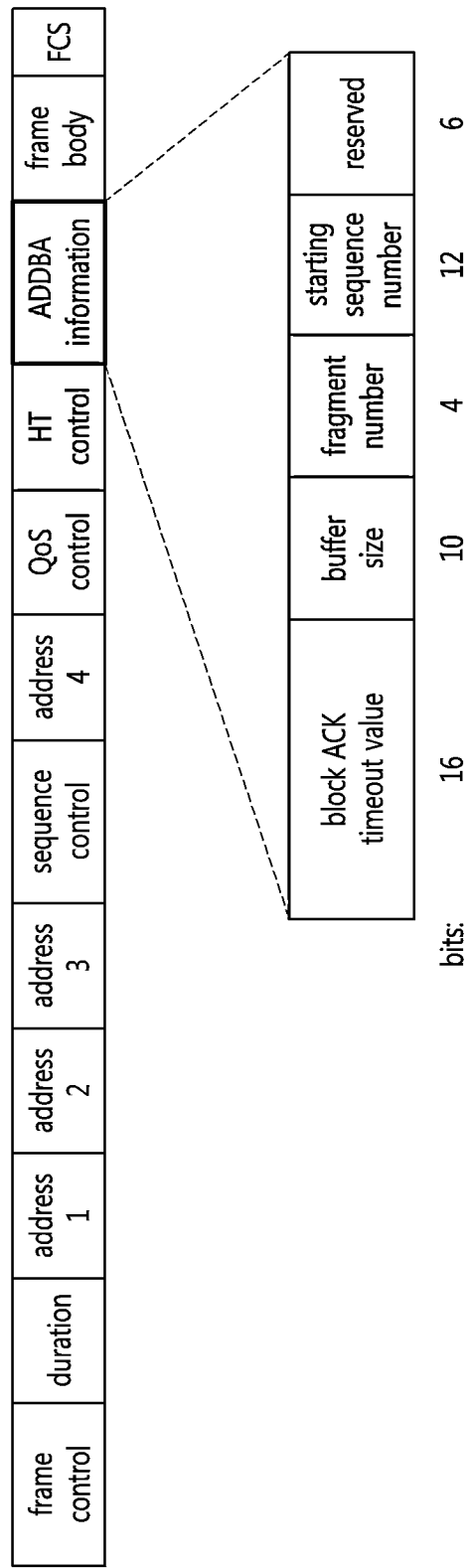
FIG. 7 is a block diagram illustrating a first embodiment of a data frame including an add block acknowledgment (ADDBA) information field.

FIG. 7 is a block diagram illustrating a first embodiment of a data frame including an ADDBA information field.

As shown in FIG. 7, a new ADDBA information field may be defined in a MAC header of the data frame (e.g., QoS data MPDU). Reserved bits constituting a type field and a subtype field included in a frame control field may be used for the ADDBA information field. The size of the ADDBA information field may be 48 bits. The ADDBA information field may indicate at least one of a block ACK timeout value, a buffer size, a fragment number, or a starting sequence number among BA parameters agreed upon in the block ACK agreement procedure. Since the above-described BA parameters are included in the data frame, the block ACK agreement procedure before transmission of the data frame may be omitted. In other words, the block ACK agreement procedure may be performed through the transmission of the data frame including the ADDBA information field.

When the first MPDU (e.g., the first data frame) is transmitted in a transmission procedure of an A-MPDU (e.g., when a new block ACK session is started), the first MPDU may include the above-described BA parameters (e.g., BA parameters included in the ADDBA information field shown in FIG. 7). The block ACK timeout value may indicate an end time of the block ACK session. When the block ACK timeout value is obtained, the corresponding block ACK timeout value may be set to a block ACK timeout value field included in an ADDBA information field to be described with reference to FIG. 10. By this operation, the timeout value of the block ACK session may be contracted.

If a data frame is not transmitted/received during a time period corresponding to the block ACK timeout value after receiving a BA, it may be determined that the corresponding block ACK session is terminated. For example, if a data frame is not received for a time period corresponding to the block ACK timeout value after the second communication node (hereinafter referred to as 'receiver') shown in FIG. 5 receives the data frame (e.g., QoS data frame) from the first communication node (hereinafter, referred to as 'transmitter') shown in FIG. 5, the second communication node may determine that the block ACK session is terminated.

The buffer size may be used to coordinate a transmission window size of the transmitter and a transmission window size of the receiver. The transmitter may propose to the receiver the maximum number of MAC service data units (MSDUs) (or MPDUs) transmittable in the corresponding block ACK session by using the buffer size indicated by the ADDBA information field. The receiver may compare the buffer size indicated by the ADDBA information field included in the data frame received from the transmitter with the size of a reordering buffer of the receiver. The receiver may set a smaller value among the buffer size indicated by the ADDBA information field and the size of the reordering buffer in a buffer size field included in the ADDBA information field to be described with reference to FIG. 10. By this operation, the buffer size in the block ACK session may be determined.

The fragment number may be used to record a fragment order of the MSDU. The starting sequence number may be a sequence number of the first MPDU (or the first MSDU) in the A-MPDU in the new block ACK session. The transmitter may indicate a start point of a block ACK bitmap by notifying the receiver of the starting sequence number. The receiver may update the bitmap based on the starting sequence number obtained from the transmitter. The receiver may inform successfully-received MSDU(s) (or MPDU(s)) by transmitting the BA including the bitmap to the transmitter. According to the above-described operations, the BA operation may be reliably implemented.

The ADDBA information field shown in FIG. 7 may be included in the first MPDU in the A-MPDU. Alternatively, the ADDBA information field may be included in one or more MPDUs in the A-MPDU. The types of parameters included in the ADDBA information field may vary according to the size of the ADDBA information field.

Figure 8:
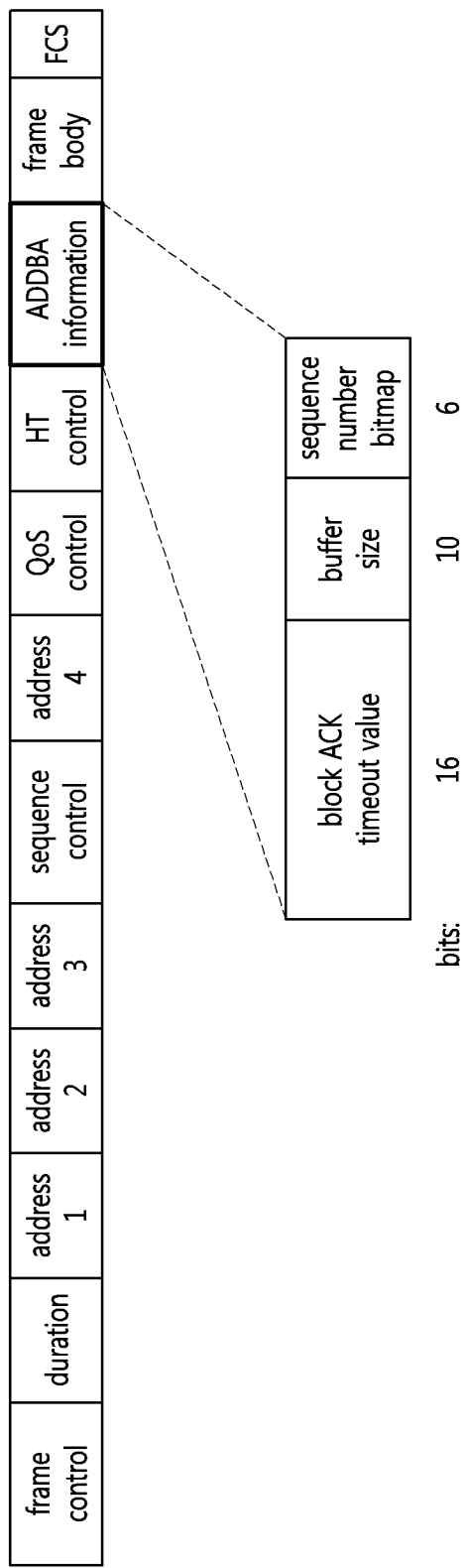
FIG. 8 is a block diagram illustrating a second embodiment of a data frame including an ADDBA information field.

FIG. 8 is a block diagram illustrating a second embodiment of a data frame including an ADDBA information field.

As shown in FIG. 8, a new ADDBA information field may be defined in a MAC header of the data frame (e.g., QoS data MPDU). Reserved bits constituting a type field and a subtype field included in a frame control field may be used for the ADDBA information field. The size of the ADDBA information field may be 32 bits. The ADDBA information field may indicate at least one of a block ACK timeout value, a buffer size, or a sequence number bitmap among BA parameters agreed upon in the block ACK agreement procedure. The block ACK timeout value may be used identically or similarly to the block ACK timeout value shown in FIG. 7. The buffer size may be used identically or similarly to the buffer size shown in FIG. 7. The starting sequence number shown in FIG. 7 may be integrated and managed in the sequence number bitmap.

The ADDBA information field shown in FIG. 8 may be included in the first MPDU in the A-MPDU. Alternatively, the ADDBA information field may be included in one or more MPDUs in the A-MPDU. The types of parameters included in the ADDBA information field may vary according to the size of the ADDBA information field.

FIG. 9 is a conceptual diagram illustrating a first embodiment of a sequence number bitmap.

As shown in FIG. 9, the size of the sequence number bitmap may be 6 bits. The size of the sequence number bitmap may be set in consideration of the maximum number of MPDUs included in the A-MPDU. The sequence number bitmap included in the first MPDU (e.g., MPDU #1) in the A-MPDU may be set to '100000'. The first bit of the sequence number bitmap, which is set to 1, may indicate that a sequence number of a sequence control field of the MPDU #1 is the starting sequence number. In the same manner, a sequence number bitmap included in the second MPDU (e.g., MPDU #2) in the A-MPDU may be set to '010000'. The second bit of the sequence number bitmap, which is set to 1, may indicate that a sequence number of a sequence control field of the MPDU #2 is a sequence number next to the starting sequence number. In other words, the position of the bit set to 1 in the sequence number bitmap may indicate the sequence number.

In another embodiment, a value of the bit string constituting the sequence number bitmap may indicate the sequence number. Since the value of the bit string constituting the sequence number bitmap included in the MPDU #1 is 1, this may indicate that the sequence number of the sequence control field of the MPDU #1 is the starting sequence number. Since a value of the bit string constituting the sequence number bitmap included in the MPDU #2 is 2, this may indicate that the sequence number of the sequence control field of the MPDU #2 is a sequence number next to the starting sequence number.

Figure 10:
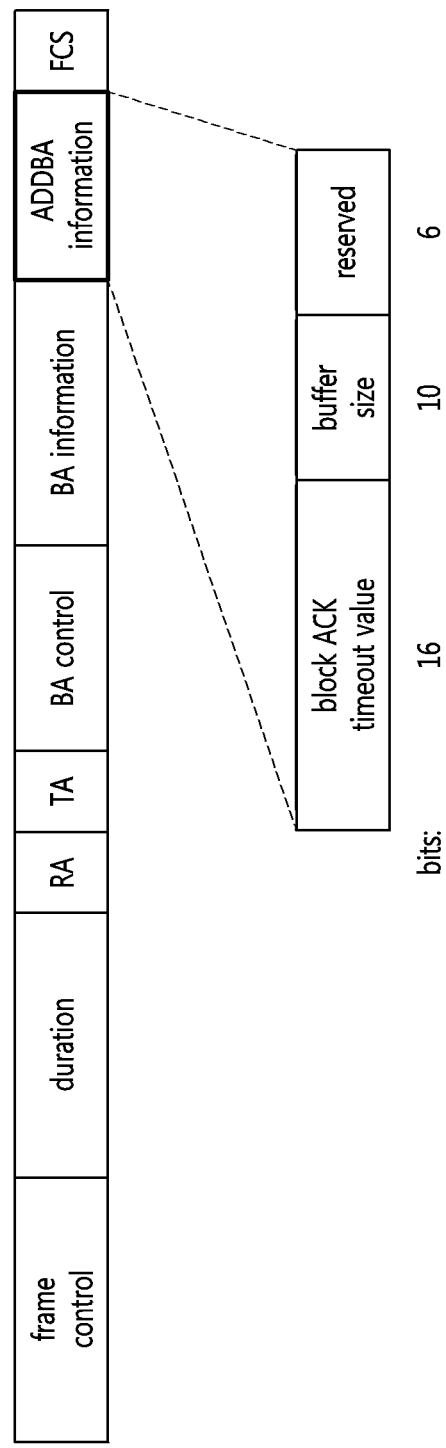
FIG. 10 is a block diagram illustrating a first embodiment of a block ACK or BA including an ADDBA information field.

FIG. 10 is a block diagram illustrating a first embodiment of a BA including an ADDBA information field.

As shown in FIG. 10, a new ADDBA information field may be defined in a MAC header of a BA transmitted by the receiver. Reserved bits constituting a type field and a subtype field included in a frame control field may be used for the ADDBA information field. The size of the ADDBA information field may be 32 bits. The ADDBA information field may indicate a block ACK timeout value and/or a buffer size among BA parameters agreed upon in the block ACK agreement procedure. A fragment number and a start sequence number may be indicated by a BA information field. Since the above-described BA parameters are included in the BA, the block ACK agreement procedure may be omitted.

Upon receiving a BAR from the transmitter, the receiver may transmit the BA including the ADDBA information field to the transmitter. Alternatively, when an implicit BAR mode is used, the receiver may transmit the BA including the ADDBA information field to the transmitter whenever an A-MPDU is received. If the block ACK agreement procedure is not performed, the BA including the ADDBA information field may be transmitted.

The block ACK timeout value may indicate an end time of the block ACK session. The receiver may set the block ACK timeout value (e.g., block ACK timeout value obtained from a data frame) in the block ACK timeout value field included in the ADDBA information field of the BA. By this operation, the timeout value of the current block ACK session may be contracted.

If a data frame is not transmitted/received during a time period corresponding to the block ACK timeout value after receiving the BA from the receiver, the transmitter may determine that the corresponding block ACK session is terminated. If a data frame is not transmitted/received during a time period corresponding to the block ACK timeout value after receiving a data frame (e.g., QoS data MPDU) from the transmitter, the receiver may determine that the corresponding block ACK session is terminated.

The buffer size may be used to coordinate a transmission window size of the transmitter and a transmission window size of the receiver. The transmitter may propose to the receiver the maximum number of MSDUs (or MPDUs) transmittable in the corresponding block ACK session by using the buffer size indicated by the ADDBA information field. The receiver may compare the buffer size indicated by the ADDBA information field included in the data frame received from the transmitter with the size of a reordering buffer of the receiver. The receiver may set a smaller value among the buffer size indicated by the ADDBA information field and the size of the reordering buffer in a buffer size field included in an ADDBA information field. By this operation, the buffer size may be determined in the block ACK session.

The ADDBA information field shown in FIG. 10 may be included in all BAs. Alternatively, the ADDBA information field may be included in one or more BAs. The types of parameters included in the ADDBA information field may vary according to the size of the ADDBA information field.

Figure 11:
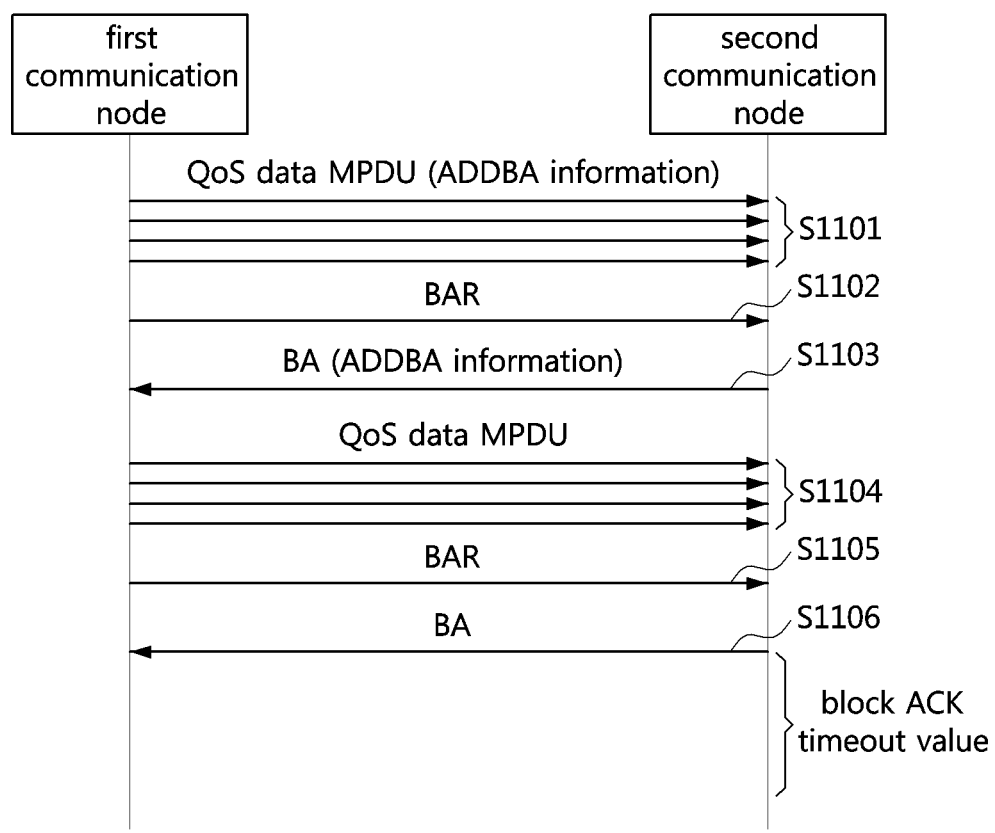
FIG. 11 is a sequence chart illustrating a second embodiment of a block ACK operation in a wireless LAN system.

FIG. 11 is a sequence chart illustrating a second embodiment of a block ACK operation in a wireless LAN system.

As shown in FIG. 11, the block ACK agreement procedure may not be performed. The parameters (e.g., information indicating the buffer size, etc.) necessary for establishing a block ACK session in the block ACK agreement procedure may be agreed upon (e.g., negotiated) through exchanging ADDBA information. When the block ACK agreement procedure is not performed, the first communication node and the second communication node may use predefined parameters (e.g., BA parameters).

The first communication node (e.g., transmitter) may transmit a QoS data MPDU (e.g., data frame) including an ADDBA information field (e.g., ADDBA information field shown in FIG. 7 or FIG. 8) to the second communication node (e.g., receiver) (S1101). Step S1101 may be performed at a start time of a block ACK session. For example, the block ACK session may be initiated by the data frame transmitted in step S1101. The ADDBA information field may be included in the first MPDU in the A-MPDU transmitted in step S1101. Alternatively, the ADDBA information field may be included in one or more MPDUs in the A-MPDU transmitted in step S1101. The first communication node may transmit parameters necessary for establishing the block ACK session to the second communication node by transmitting MPDU(s) including the ADDBA information field. The second communication node may receive the MPDUs from the first communication node and may identify the parameters indicated by the ADDBA information field included in the MPDU(s). If different values instead of predefined BA parameters are to be used, the ADDBA information field indicating the BA parameters (e.g., BA parameters set to the different values) may be selectively included in the MPDU(s). In the case of using the predefined BA parameters, the MPDU(s) may not include the ADDBA information field.

When transmission of the data frames (e.g., MPDUs) is completed, the first communication node may transmit a BAR to the second communication node (S1102). Upon receiving the BAR from the first communication node, the second communication node may transmit a BA including an ADDBA information field (e.g., ADDBA information field shown in FIG. 10) to the first communication node (S1103). Alternatively, the BA including the ADDBA information field may be transmitted without reception of the BAR. The ADDBA information included in the BA may be determined in consideration of the ADDBA information included in the data frame received in step S1101. By exchanging the data frame including the ADDBA information field and the BA including the ADDBA information field, the block ACK operation (e.g., BA parameters) may be agreed upon.

Thereafter, a data frame (e.g., QoS data MPDU) transmitted in the same block ACK session as the data frame transmitted in step S1101 may not include the ADDBA information field. In other words, steps S1104, S1105, and S1106 may be performed using the BA parameters agreed through steps S1101, S1102, and S1103. For example, the first communication node may transmit data frames that do not include the ADDBA information field to the second communication node (S1104). When the transmission of the data frames is completed, the first communication node may transmit a BAR to the second communication node (S1105). The second communication node may receive the data frames from the first communication node. Upon receiving the BAR from the first communication node, the second communication node may transmit a BA that does not include the ADDBA information field to the second communication node (S1106). Alternatively, the BA may be transmitted without reception of the BAR. When predefined BA parameters are used, the ADDBA information field may not be transmitted/received in steps S1101, S1102, and S1103. Therefore, the BA parameters used in steps S1104 to S1106 may be the same as BA parameters used in a data transmission/reception procedure performed without an initial BA agreement (e.g., initial BA negotiation).

If a data frame is not transmitted/received during a time period corresponding to the block ACK timeout value, the first communication node and the second communication node may determine that the corresponding block ACK session is terminated even without a DELBA. When the initial BA agreement procedure is not performed, a predefined value may be used as the block ACK timeout value. Alternatively, the value negotiated through the exchange of the ADDBA information field in steps S1101, S1102, and S1103 may be used as the block ACK timeout value. When the block ACK session is terminated, BA parameters for the next block ACK session may be agreed upon using the ADDBA information field (e.g., ADDBA information field shown in FIGS. 7, 8, and/or 10).

Figure 12:
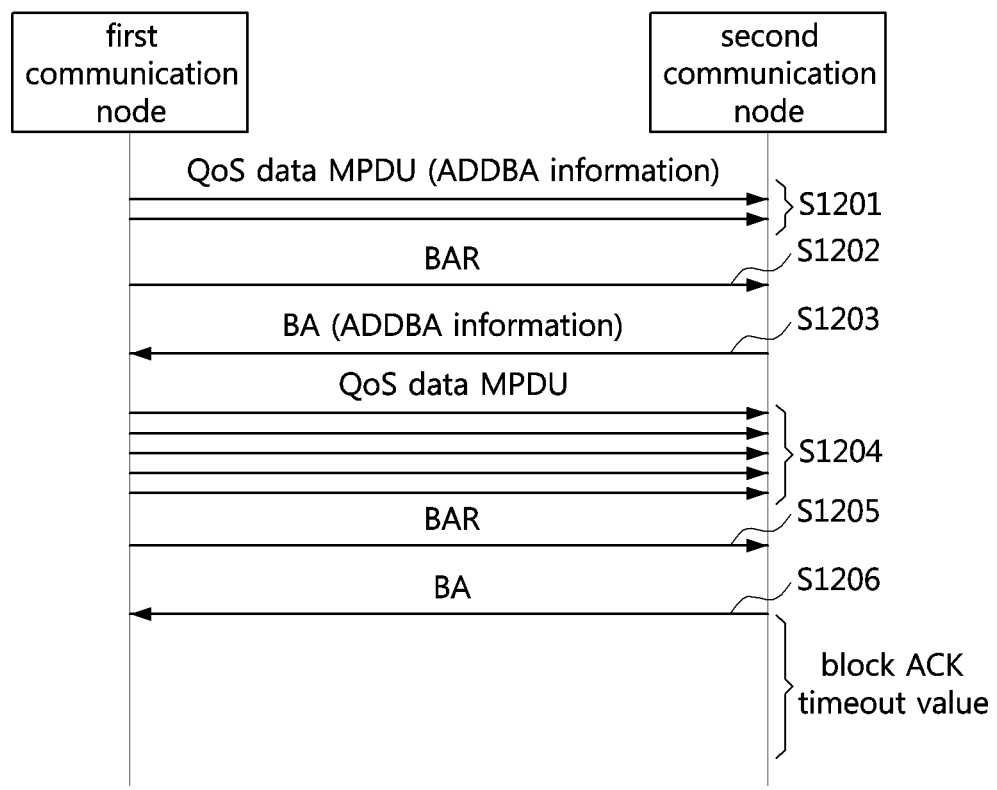
FIG. 12 is a sequence chart illustrating a third embodiment of a block ACK operation in a wireless LAN system.

FIG. 12 is a sequence chart illustrating a third embodiment of a block ACK operation in a wireless LAN system.

As shown in FIG. 12, the first communication node (e.g., transmitter) may transmit an A-MPDU without knowledge of the buffer size of the second communication node (e.g., receiver). Here, the number of MPDUs included in the A-MPDU may be adjusted by the first communication node. The buffer size indicated by the ADDBA information field may be used to coordinate a transmission window size of the first communication node and a reception window size of the second communication node. The buffer size may be set to a value (e.g., the same value) predefined by the first communication node and the second communication node.

The first communication node may propose the number of QoS data MPDUs transmittable in the block ACK session to the second communication node by using the buffer size field included in the ADDBA information field of the QoS data MPDU. Here, the number of transmittable QoS data MPDUs may indicate the buffer size. When the buffer size is different from a predefined value, the number of QoS data MPDUs transmittable in the block ACK session may be suggested. For example, the first communication node may transmit a QoS data MPDU including the above-described ADDBA information field to the second communication node (S1201). When the transmission of the QoS data MPDU is completed, the first communication node may transmit a BAR to the second communication node (S1202).

The second communication node may receive the QoS data MPDU from the first communication node and may identify the ADDBA information field included in the QoS data MPDU. The second communication node may compare the buffer size indicated by the ADDBA information field with the reordering buffer size of the second communication node. Here, the size of the reordering buffer to be compared may be predefined. The predefined reordering buffer size may be different from the value (i.e., buffer size indicated by the ADDBA information field) set by the first communication node and the second communication node. The value set by the first communication node and the second communication node may be smaller than the reordering buffer size that can be processed by the second communication node. The second communication node may set a smaller value among the buffer size indicated by the ADDBA information field and the reordering buffer size in the buffer size field included the ADDBA information field of the BA. By this operation, the buffer size in the corresponding block ACK session may be determined. Upon receiving the BAR from the first communication node, the second communication node may transmit the BA including the above-described ADDBA information field to the first communication node (S1203). The ADDBA information included in the BA may be determined in consideration of the ADDBA information included in the data frame received in step S1201. The first communication node may receive the BA from the second communication node and may identify the information indicated by the ADDBA information field included in the BA. By exchanging the data frame including the ADDBA information field and the BA including the ADDBA information field, the block ACK operation (e.g., BA parameters) may be agreed upon.

However, the first communication node may not identify the buffer size of the second communication node before step S1201. Therefore, even when the buffer size of the second communication node is 5 (e.g., when transmission of an A-MPDU including 5 MPDUs is possible), the first communication node may transmit an A-MPDU including less than 5 MPDUs to the second communication node. In other words, the first communication node may transmit the A-MPDU in consideration of the maximum buffer size of the second communication node. Here, the maximum buffer size may be a value preconfigured between the first communication node and the second communication node. The maximum buffer size may be preconfigured before transmission of the MPDU.

When steps S1201, S1202, and S1203 are performed, the first communication node may identify that the buffer size of the second communication node is 5. Accordingly, the first communication node may transmit an A-MPDU including five MPDUs to the second communication node (S1204) and may transmit a BAR to the second communication node after transmitting the A-MPDU (S1205). The MPDU transmitted in step S1204 may not include an ADDBA information field.

The second communication node may receive the A-MPDU from the first communication node. Upon receiving the BAR from the first communication node, the second communication node may transmit a BA that does not include the ADDBA information field to the first communication node (S1206). Alternatively, the BA may be transmitted without reception of the BAR. If a MPDU is not transmitted/received during a time period corresponding to the block ACK timeout value, the first communication node and the second communication node may determine that the corresponding block ACK session is terminated even without a DELBA. When the block ACK session is terminated, BA parameters for the next block ACK session may be agreed by using the ADDBA information field (e.g., ADDBA information field shown in FIGS. 7, 8, and/or 10).

Figure 13:
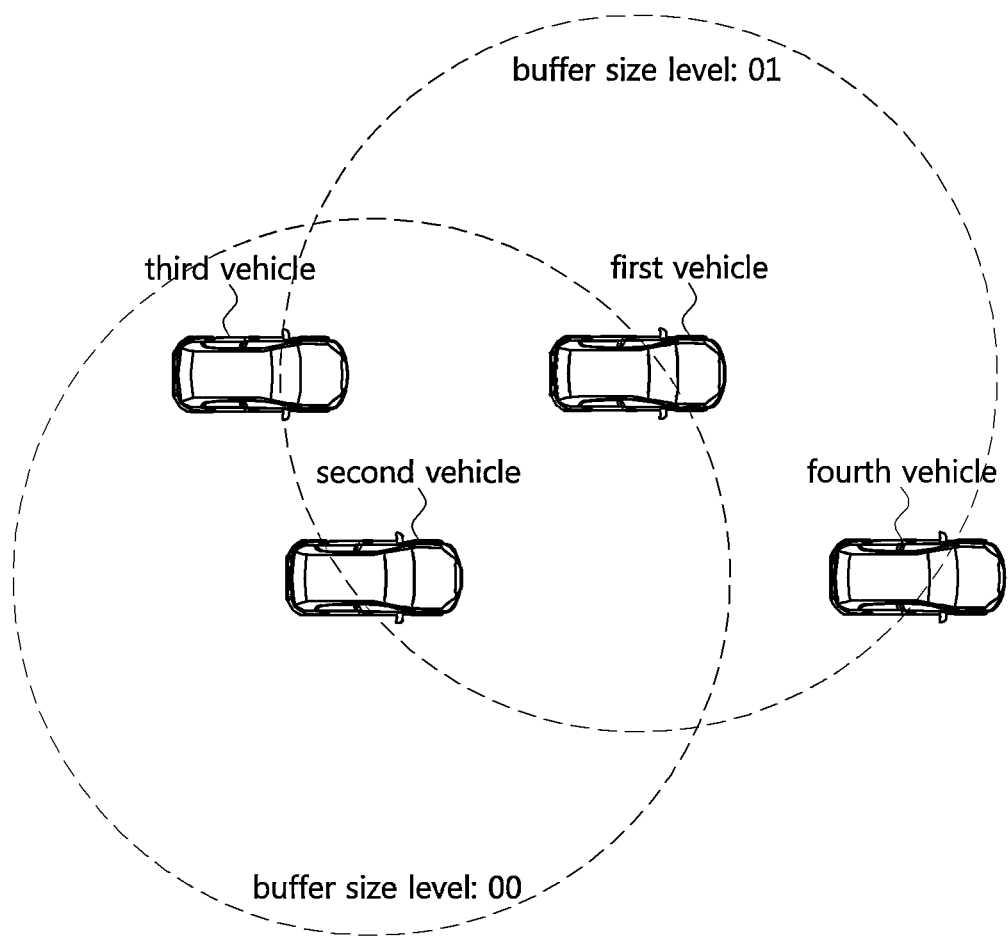
FIG. 13 is a conceptual diagram illustrating a first embodiment of a method for transmitting a message including information on a buffer size level (or buffer size information) in a wireless LAN system.

FIG. 13 is a conceptual diagram illustrating a first embodiment of a method for transmitting a message including information on a buffer size level (or buffer size information) in a wireless LAN system.

As shown in FIG. 13, a vehicle may transmit a basic safety message (BSM) and/or a safety-related message. The BSM and/or safety-related messages may be transmitted periodically. Reserved bit(s) included in the BSM and/or safety-related message may be used to indicate a buffer size level (or buffer size). In embodiments, the message may mean a frame. Before a transmitter (e.g., the first communication node shown in FIG. 11 or FIG. 12) obtains ADDBA information of a receiver (e.g., the second communication node shown in FIG. 11 or FIG. 12), the transmitter may not know the buffer size of the receiver.

To solve this problem, the receiver may transmit a BSM and/or safety-related message including information on its own buffer size level (or buffer size information). The BSM and/or safety-related message may be transmitted before step S1101 shown in FIG. 11 or step S1201 shown in FIG. 12. The number of MPDUs included in the data frame transmitted in step S1101 shown in FIG. 11 or step S1201 shown in FIG. 12 may be determined based on the buffer size level (or buffer size) indicated by the BSM and/or safety-related message.

For example, a field having a size of 2 bits included in the BSM and/or safety-related message may indicate the buffer size level. Alternatively, a field having a size of 10 bits included in the BSM and/or safety-related message may indicate the buffer size. The buffer size level may be defined as shown in Table 3 below.

TABLE 3

| Buffer size level | Description |
| --- | --- |
| 00 | No available buffer |
| 01 | ⅓ or less of the entire buffer is available |
| 10 | ⅔ or less of the entire buffer is available |
| 11 | The entire buffer is available |

A first vehicle (e.g., a first station located in a first vehicle) may transmit a message (e.g., BSM and/or safety-related message) including information of the buffer size level set to '01' when ⅓ or less of the entire buffer is available. Surrounding vehicles (e.g., stations located in the surrounding vehicles) may receive the message from the first vehicle and may identify the buffer size level included in the message. When the buffer size level is '01', the surrounding vehicles may determine that the buffer size of the first vehicle is ⅓ or less of the maximum buffer size. The surrounding vehicles may generate an A-MPDU according to the buffer size of the first vehicle and may transmit the generated A-MPDU to the first vehicle. Here, the A-MPDU may include an ADDBA information field.

The second vehicle may transmit the message including information of the buffer size level set to '00' when there is no buffer available. The surrounding vehicles may receive the message from the second vehicle and identify the buffer size level included in the message. When the buffer size level is set to '00', the surrounding vehicles may determine that the buffer of the second vehicle is not empty. Accordingly, the surrounding vehicles may not transmit data to the second vehicle. The fragment number field may be used to indicate the buffer size level. In this case, a maximum of 4 bits may be used to indicate the buffer size level.

A multi-link device (MLD) may perform communications using a plurality of links. The MLD may include a communication terminal (e.g., STA) in charge of each of the plurality of links. The MLD may include one reordering buffer. A buffer size indicated by a message transmitted by each communication terminal included in the MLD may be a value in consideration of the size of the reordering buffer occupied by a message received through another link. The buffer size indicated by the message transmitted by each communication terminal included in the MLD may be dynamically changed each time data is received. When a data unit successfully received is transmitted to an upper layer and a BA for the data unit is transmitted, the size of the reordering buffer may be modified. The size of the reordering buffer may be modified based on a data unit successfully received at another communication terminal included in the same MLD. The another link described above may refer to a different communication channel.

Figure 14:
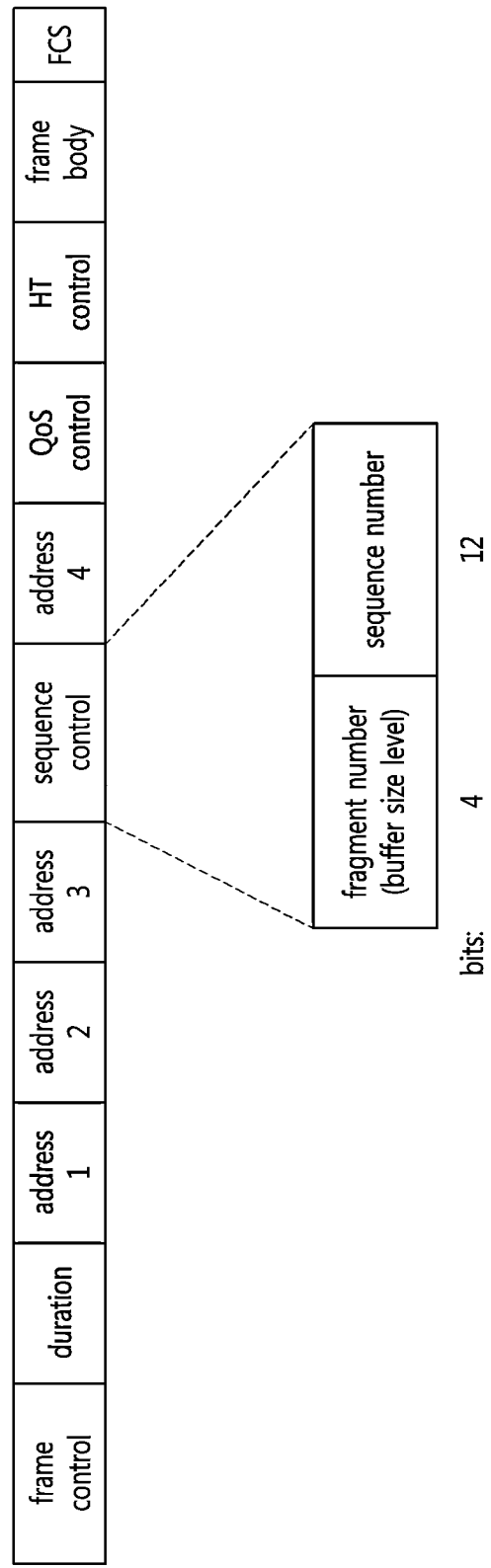
FIG. 14 is a block diagram illustrating a first embodiment of a frame including buffer size level information.

FIG. 14 is a block diagram illustrating a first embodiment of a frame including buffer size level information.

As shown in FIG. 14, a fragment number field included in a sequence control field may be used to indicate a buffer size level. When value(s) of bit(s) of a type field and a subtype field included in a frame control field (e.g., values of reserved bit(s)) are set to specific value(s), the fragment number field having a size of 4 bits may be used to indicate the buffer size level.

In another embodiment, when the bit(s) of the type field and the subtype field included in the frame control field (e.g., the value(s) of the reserved bit(s)) are set to specific values, a duration field may be used to indicate is the buffer size level. For example, when the duration field indicates a unique duration value (e.g., when a duration indicated by the duration field is the length of data), the corresponding duration field may indicate that the buffer size level is 00. In this case, surrounding vehicles that have identified the duration field may determine that the buffer of the vehicle that has transmitted the frame including the duration field is not empty, and the surrounding vehicles may not transmit data to the corresponding vehicle.

When the duration field indicates (duration+½*slot_time), the corresponding duration field may indicate that the buffer size level is 01. In this case, surrounding vehicles that have identified the duration field may determine that the buffer size of the vehicle that has transmitted the frame including the duration field is ⅓ or less of the maximum buffer size, and the surrounding vehicles may transmit an A-MPDU in consideration of the buffer size of the corresponding vehicle. Here, the A-MPDU may include an ADDBA information field.

When the duration field indicates (duration+slot_time), the corresponding duration field may indicate that the buffer size level is 10. When the duration field indicates (duration+SIFS), the corresponding duration field may indicate that the buffer size level is 11.

In another embodiment, the duration field may be set to a value of 13 μs or less, which is the size of one slot. The value indicated by the duration field may vary depending on the buffer size level. The duration field may be set as shown in Table 4 below.

TABLE 4

| Duration field value | Buffer size level | Description |
| --- | --- | --- |
| 3 μs | 00 | No available buffer |
| 6 μs | 01 | ⅓ or less of the entire buffer is available |
| 9 μs | 10 | ⅔ or less of the entire buffer is available |
| 12 μs | 11 | The entire buffer is available |

When the duration field indicates (duration+3 μs), the corresponding duration field may indicate that the buffer size level is 00. When the duration field indicates (duration+6 μs), the corresponding duration field may indicate that the buffer size level is 01. When the duration field indicates (duration+9 μs), the corresponding duration field may indicate that the buffer size level is 10. When the duration field indicates (duration+12 μs), the corresponding duration field may indicate that the buffer size level is 11.

The operation of notifying the buffer size level using the duration field may be applied to an operation according to the IEEE 802.11bd specification. For example, a PPDU defined in the IEEE 802.11bd specification may include the duration field indicating the buffer size level. Therefore, even when the duration field is used to indicate the buffer size level, the corresponding duration field may not affect the operations of a legacy station.

Figure 15:
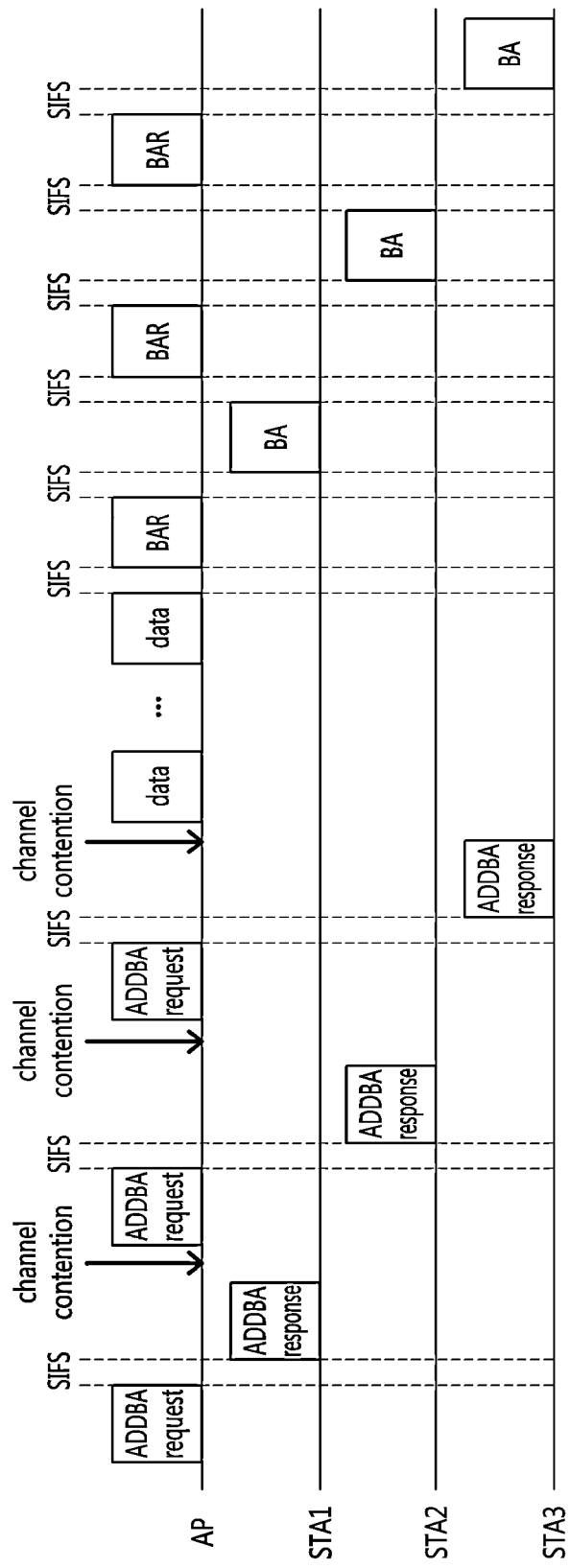
FIG. 15 is a timing diagram illustrating a first embodiment of a 'groupcast with retries (GCR)' operation in a wireless LAN system.

FIG. 15 is a timing diagram illustrating a first embodiment of a 'groupcast with retries (GCR)' operation in a wireless LAN system.

As shown in FIG. 15, when a GCR operation is supported, an access point may transmit a data frame to a plurality of stations based on a multicast scheme or a groupcast scheme, and each of the plurality of stations may transmit an ACK for the data frame to the access point. An address field of the data frame transmitted based on the multicast scheme or the groupcast scheme may be set to a multicast address. The multicast address may be a terminal address representing the plurality of stations. When the address field of the data frame is set to the multicast address, the station(s) associated with the multicast address (e.g., station(s) participating in multicast communication or groupcast communication) may perform decoding operations on the data frame.

The GCR operation may include an operation of transmitting a data frame to a plurality of stations, an operation of identifying a reception status (e.g., ACK) of the data frame, and an operation of retransmitting a data frame that has failed to be received. The communication nodes (e.g., access point and/or station), which are subjects of the GCR operation, may exchange an ADDBA request frame and an ADDBA response frame. Thus, a scheme for identifying the reception status (hereinafter referred to as 'reception status negotiation procedure') may be negotiated. The reception status negotiation procedure may be a negotiation procedure of parameter(s) used for ACK transmission.

The access point may acquire a channel through contention before a transmission time of the data frame and may transmit the data frame on the acquired channel. In the acquired channel, the data frame may be transmitted in the multicast scheme or groupcast scheme. Also, a plurality of data frames may be transmitted on the acquired channel.

When transmission of the data frame is completed, the access point may transmit a BAR to trigger BA transmission. Upon receiving the BAR from the access point, the station may transmit a BA to the access point after a SIFS elapses from a reception time of the BAR. A block ACK operation (e.g., BAR transmission/reception operation and BA transmission/reception operation) may be performed by each of the plurality of stations participating in the GCR operation. The access point may receive a BA from each of the plurality of stations and may identify a data frame that has not been received at the station(s) based on the BA. If there is a data frame that has failed to be received, the access point may acquire a channel through contention and may retransmit the data frame on the acquired channel.

Figure 16A:
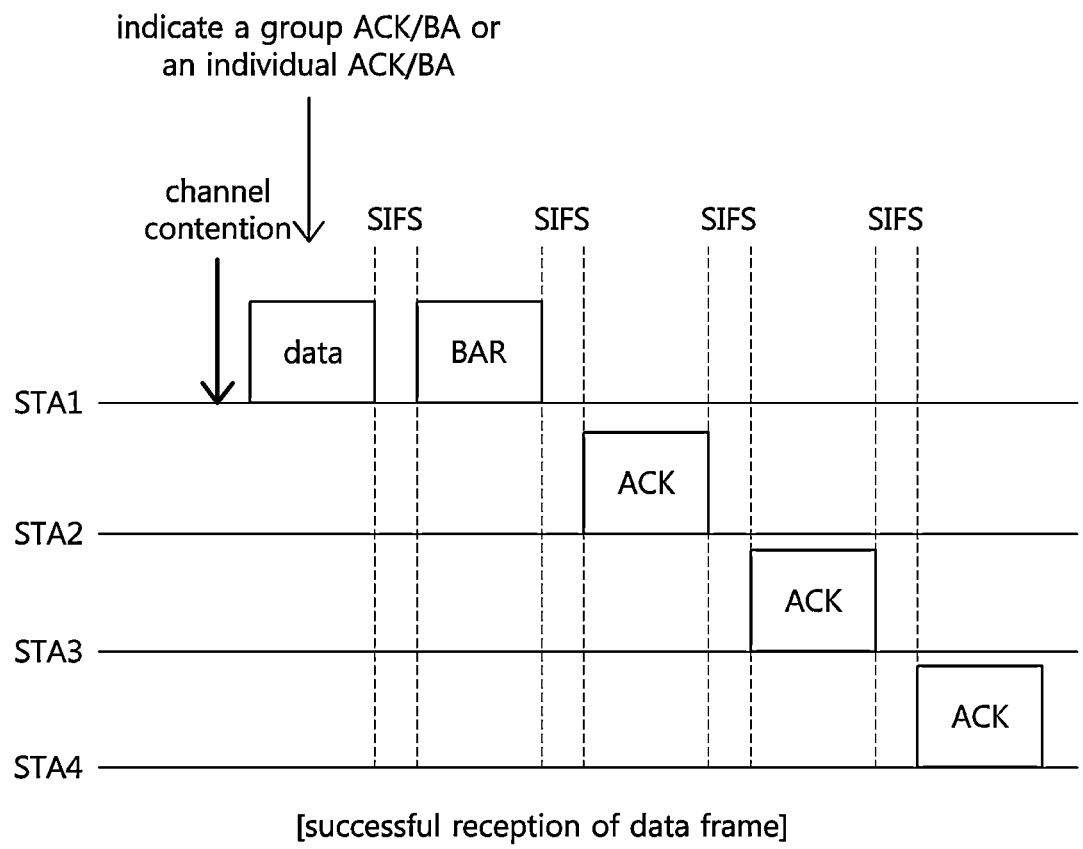
FIG. 16A is a timing diagram illustrating a first embodiment of a method for transmitting/receiving an ACK in an OCB environment.
Figure 16B:
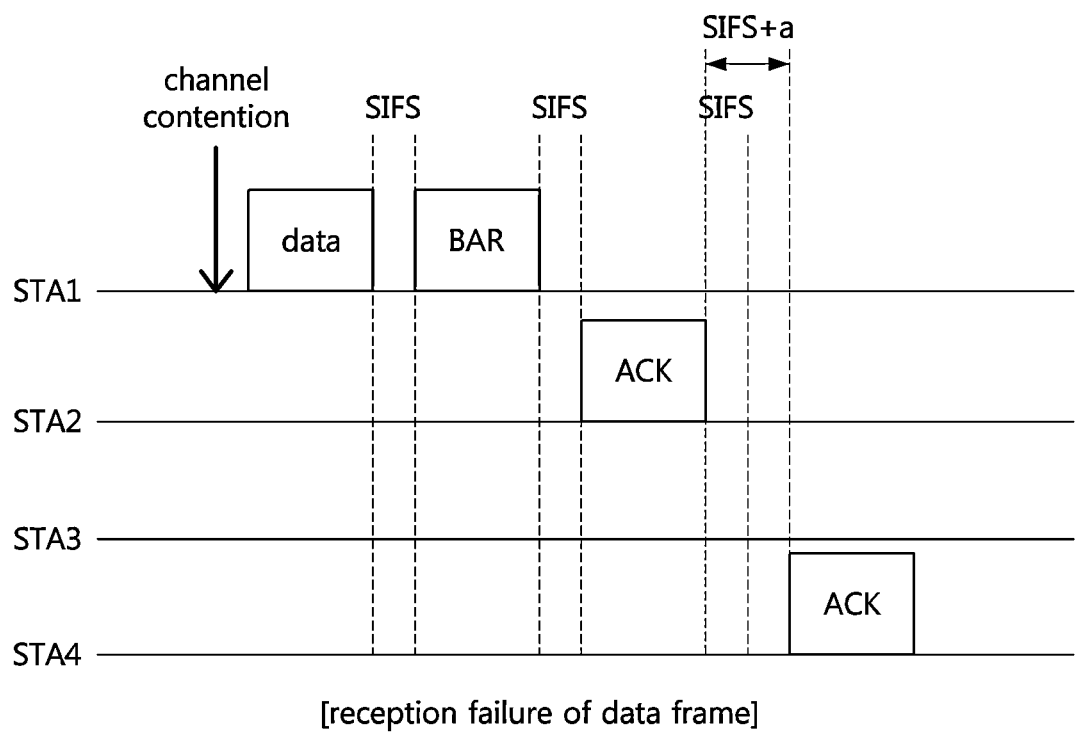
FIG. 16B is a timing diagram illustrating a second embodiment of a method for transmitting/receiving an ACK in an OCB environment.

FIG. 16A is a timing diagram illustrating a first embodiment of a method for transmitting/receiving an ACK in an 'outside a context of BSS (OCB)' environment. FIG. 16B is a timing diagram illustrating a second embodiment of a method for transmitting/receiving an ACK in an OCB environment.

As shown in FIGS. 16A and 16B, a station may perform a GCR operation in an OCB environment without association with an access point. In order to perform the GCR operation in the OCB environment, a group (e.g., STA group) may be preconfigured by an application layer. GCR parameter(s) negotiated in a block ACK operation may be configured by an application layer message. The GCR parameters may include BA parameters (e.g., buffer size information). In embodiments, the GCR operation in an OCB environment may be referred to as an 'OCB GCR operation'. The OCB GCR operation may be applied to a vehicle communication scenario (e.g., platooning scenario).

When the OCB GCR operation is supported, a data frame may be transmitted to stations participating in a platooning, and the stations receiving the data frame may be determined by a corresponding application layer. When the transmission of the data frame is completed, a BAR may be transmitted. The BAR may include information on an ACK transmission order. The stations may sequentially transmit ACKs at SIFS intervals based on the ACK transmission order indicated by the BAR.

The BAR including information on the ACK transmission order should be received by all stations performing the OCB GCR operation. Accordingly, the BAR may be transmitted using a low modulation and coding scheme (MCS). When the data frame includes one MPDU, a simple ACK (e.g., ACK including a frame control field+a duration field+a receiver address field+a FCS) for the data frame may be transmitted. When the data frame includes a plurality of MPDUs, a BA for the corresponding data frame may be transmitted.

Alternatively, when the data frame includes a plurality of MPDUs, a simple ACK for the corresponding data frame may be transmitted. When all MPDUs have been successfully received, a simple ACK may be transmitted. If reception of one or more MPDUs fails, the simple ACK may not be transmitted. If a simple ACK is not received, all MPDUs may be retransmitted The ACK transmission scheme (e.g., BA transmission or simple ACK transmission) may be indicated by a MAC header (e.g., MAC header included in the data frame). For example, when a specific field of the MAC header is set to a first value, this may indicate that a BA is transmitted. When the specific field of the MAC header is set to a second value, this may indicate that a simple ACK is transmitted.

A group ACK scheme or an individual ACK scheme may be used. When the group ACK scheme is used, ACKs (e.g., BAs) may be sequentially transmitted at SIFS intervals by one BAR. When the individual ACK scheme is used, the BAR may be transmitted to each terminal at SIFS intervals, and an ACK (e.g., BA) according to each BAR may be received. The MAC header included in the data frame may indicate whether the group ACK scheme or the individual ACK scheme is used.

A value indicated by the duration field included in the MAC header of the data frame may be set in consideration of the group ACK scheme or the individual ACK scheme. The station(s) that do not perform the OCB GCR operation may set a network allocation vector (NAV) based on the value indicated by the duration field included in the MAC header of the data frame.

A time required for transmission and reception of (data frame+ACK (or BA)) may be a transmission opportunity (TXOP). For example, the value indicated by the duration field included in the MAC header of the data frame may be the length of the TXOP. In a TXOP configured by STA1, other stations (e.g., STA2, STA3, STA4) may transmit ACKs (or BA) without performing a channel acquisition procedure (e.g., TXOP acquisition procedure). Station(s) that do not perform the OCB GCR operation in the TXOP may set a NAV based on the value of the duration field and may not perform frame transmission/reception operations.

When the simple ACK transmission scheme is used and reception of one or more MPDUs fails, the station may not transmit a simple ACK. In this case, since the channel is idle during (SIFS+ACK transmission time+SIFS), another station may occupy the corresponding channel. In order to prevent the channel from being occupied by another station, the station may transmit a simple ACK (e.g., negative ACK (NACK)) even when reception of one or more MPDUs fails. Here, the simple ACK may be used to indicate that the reception of the MPDU has failed. The simple ACK indicating the failure of MPDU reception may be configured differently from a simple ACK indicating successful reception of all MPDUs.

A duration for the simple ACK indicating the failure of MPDU reception may be set to (duration for a simple ACK indicating successful reception of all MPDUs+a specific time (or a time corresponding to a specific number of symbols)). The above-described duration may indicate that the simple ACK is a NACK. Here, the specific time may be 8 μs.

As another embodiment, in an embodiment shown in FIG. 16B, when the ACK transmission order is (STA2→STA3→STA4), reception of the MPDU is successful in STA2 and STA4, and reception of the MPDU is unsuccessful in STA3, STA3 may not transmit a simple ACK. In this case, since a simple ACK of STA3 is not transmitted, the channel may be occupied by another STA. In order to solve this problem, according to the ACK transmission order, STA4, which has an order after STA3, may transmit a simple ACK. For example, when the simple ACK of STA3 is not transmitted during (SIFS+a) from the transmission time of the simple ACK of STA2, STA4 may transmit the simple ACK. Here, "a" may be a time (e.g., 8 μs) corresponding to the number of symbols.

If not only STA3 but also STA4 does not transmit the simple ACK, STA5 following STA4 may transmit a simple ACK according to the ACK transmission order. For example, when the simple ACKs of STA3 and STA4 are not transmitted during (SIFS+a+a) from the transmission time of the simple ACK of STA2, STA5 may transmit a simple ACK.

The time added to the above-described duration may be different from a slot time (e.g., 13 μs). The type of the MAC header may be set to NACK, which may indicate that a retransmission procedure is required. Alternatively, a value of a 'more data bit' field may be set to 1, which may indicate that a retransmission procedure is required. Alternatively, a 'To DS field' and/or a field 'From DS field' of the MAC header may be set to specific values (e.g., 1, 1) not used in OCB communication.

Figure 17:
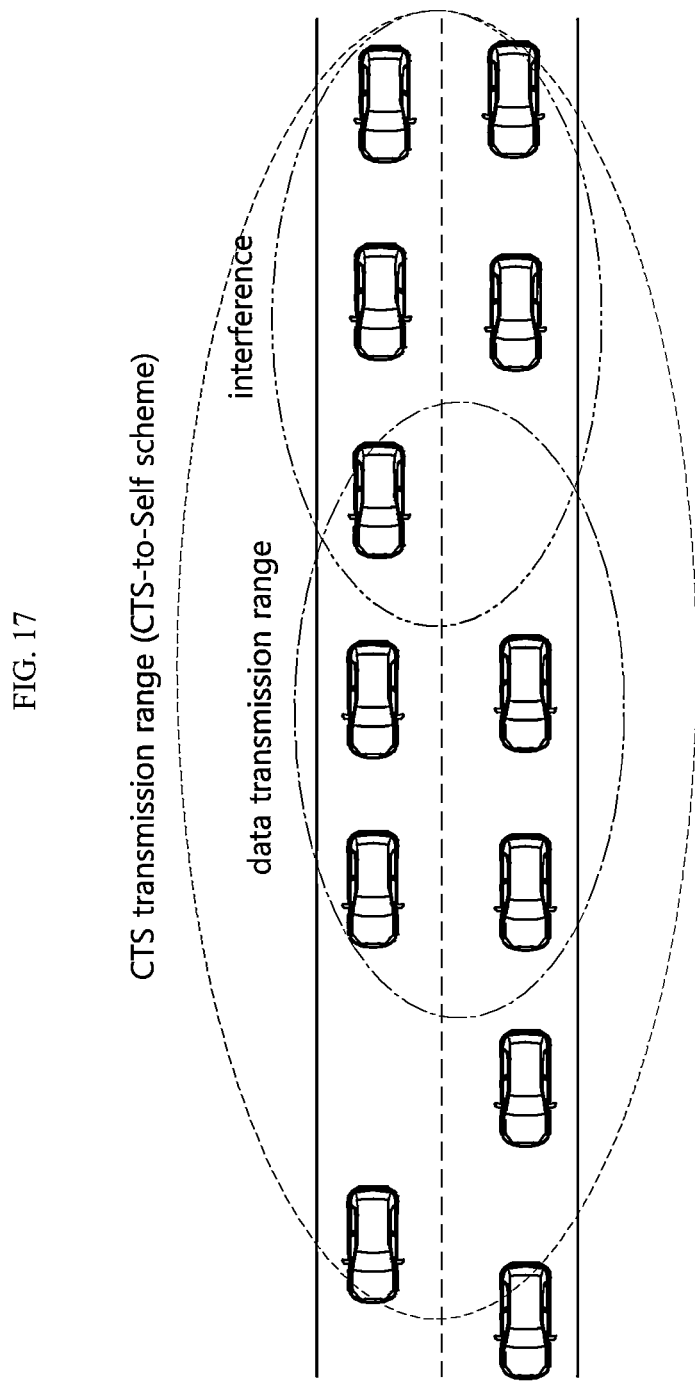
FIG. 17 is a conceptual diagram illustrating a first embodiment of a method for setting a NAV in a vehicle wireless LAN system.

FIG. 17 is a conceptual diagram illustrating a first embodiment of a method for setting a NAV in a vehicle wireless LAN system.

As shown in FIG. 17, a CTS-to-Self scheme may be used to solve a hidden node problem. In a transmission procedure of a frame, redundant channel coding bits and modulation symbols may be determined based on an MCS. When a high MCS is used, the number of transmission bits per modulation symbol may be large, and the number of redundant channel coding bits may be small. In this case, a throughput may be improved, but a range in which a corresponding frame can be received without errors may be reduced.

Critical control information may be transmitted using a low MCS. For example, important control information may be modulated using a binary phase-shift keying (BPSK) scheme. In this case, the number of redundant channel coding bits may be large, and a range in which important control information can be received without errors may be increased.

A data frame may be transmitted using a high MCS. A data transmission range (i.e., DATA TX range) may be determined based on a selected MCS. The data transmission range may be a range in which a data frame can be received without errors. A value indicated by the duration field of the data frame may be set to a NAV. For example, stations belonging to the data transmission range may set a value indicated by the duration field of the data frame as a NAV. When a high MCS is used, the number of stations setting the NAV may be small because the data transmission range is small.

In order to solve this problem, a CTS frame may be transmitted according to the CTS-to-Self scheme before transmission of the data frame. The CTS frame may be transmitted using a low MCS. In this case, stations that do not participate in the OCB GCR operation may also configure a NAV. Alternatively, the data frame may be transmitted by using the lowest MCS.

Figure 18:
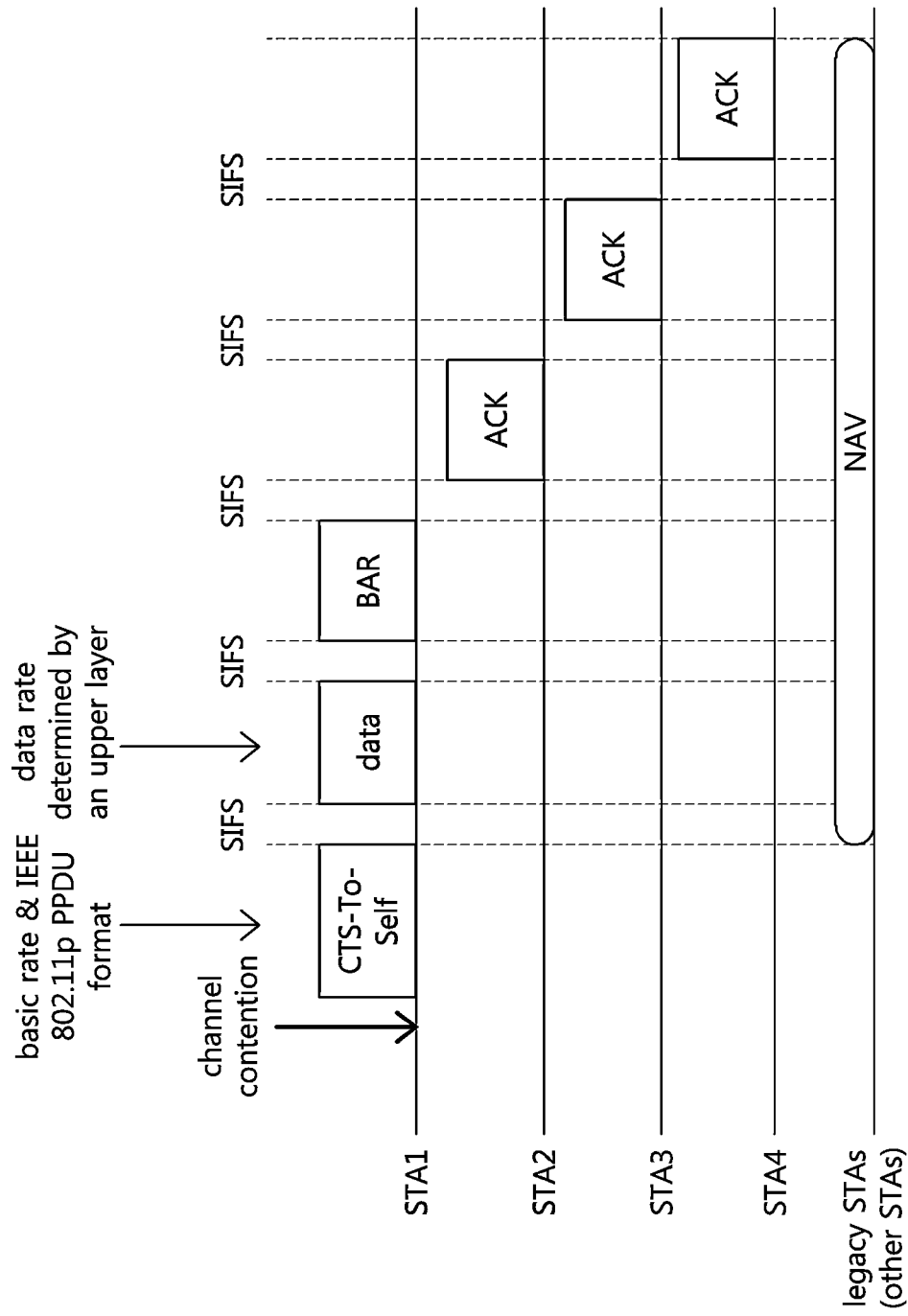
FIG. 18 is a timing diagram illustrating a first embodiment of a method for transmitting and receiving data based on a CTS-to-Self scheme in a wireless LAN system.

FIG. 18 is a timing diagram illustrating a first embodiment of a method for transmitting and receiving data based on a CTS-to-Self scheme in a wireless LAN system.

As shown in FIG. 18, stations may perform an OCB GCR operation. STA1 may transmit a CTS frame according to the CTS-to-Self scheme before transmitting a data frame. The CTS frame may be transmitted using the lowest MCS. In this case, stations (e.g., legacy STAs, other STAs) that do not participate in the OCB GCR operation among stations belonging to a CTS transmission range may set a NAV based on the CTS frame. The CTS frame may have a PPDU format according to the IEEE 802.11p specification. Accordingly, the legacy STA may set the NAV based on the CTS frame.

A receiver address (RA) of the CTS frame may be configured as a multicast address used for the OCB GCR operation. A value indicated by a duration field of the CTS frame may be set to a time required for 'data transmission/reception operation+BAR transmission/reception operation+ACK (e.g., BA) transmission/reception operation'. The stations that do not participate in the OCB GCR operation may set the NAV to the value of the duration field included in the received CTS frame, and may not use a channel in a time period corresponding to the NAV.

STA1 may transmit a data frame after a SIFS elapses from a transmission time of the CTS frame and may transmit a BAR after a SIFS elapses from a transmission time of the data frame. The BAR may include information on an ACK transmission order. The ACK transmission order may be (STA2→STA3→STA4). The stations (e.g., STA2, STA3, STA4) may receive the data frame and the BAR from STA1. The stations may sequentially transmit ACKs for the data frame at SIFS intervals according to the ACK transmission order indicated by the BAR. When the reception of the data frame fails, the corresponding station may inform that a NACK has occurred by configuring a MAC header including a value of the duration.

Figure 19:
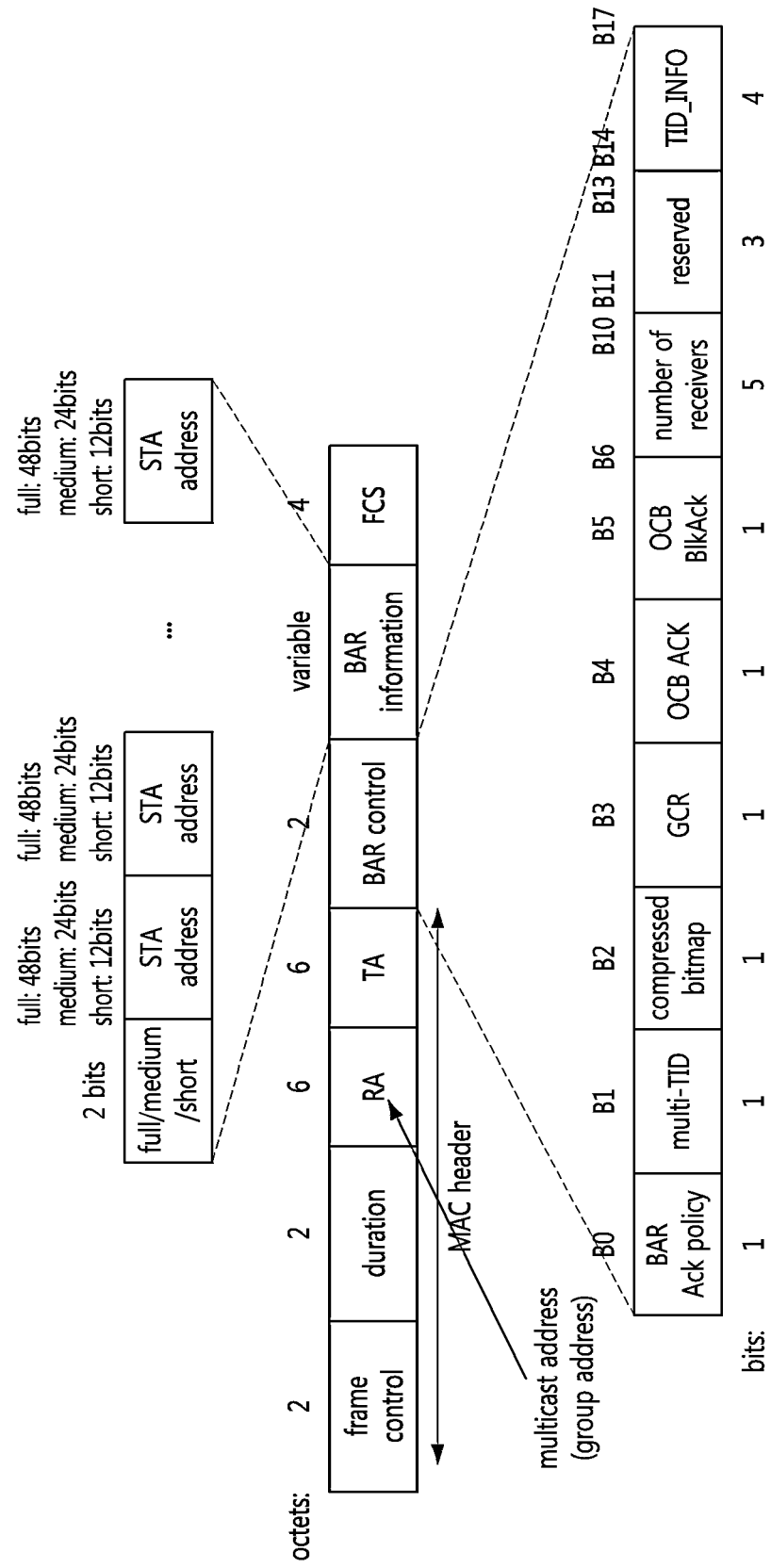
FIG. 19 is a block diagram illustrating a first embodiment of a BAR including information on an ACK transmission order.

FIG. 19 is a block diagram illustrating a first embodiment of a BAR including information on an ACK transmission order.

As shown in FIG. 19, a BAR may include information on an ACK transmission scheme. The information on the ACK transmission scheme may indicate that station(s) receiving the corresponding BAR transmits a simple ACK (e.g., OCB ACK) or a BA (e.g., OCB BA). For example, when an OCB ACK field is set to 1, this may indicate that the simple ACK transmission scheme is used. When an OCB BlkAck field is set to 1, this may indicate that the BA transmission scheme is used.

The size of a BA bitmap may be 8 bytes or 1 byte. For the OCB operation, a BA bitmap having a size of 1 byte may be used. The BAR may include a BA starting sequence control field having a size of 2 bytes. A BA information field may include a GCR group address field and a BA bitmap field. Since the number of stations is variable, the field for the number of receivers may indicate the length of the BA information field. The size of an STA address field may be 48 bits. In other words, the size of a full address of a station may be 48 bits. When the number of stations is large, the length of the BAR may increase due to the STA address fields. To solve this problem, a short address or a medium address may be used. When a short address is used, the station may be identified by using the lower 12 bits among 48 bits. When a medium address is used, the station may be identified using 24 bits among 48 bits.

The first 2 bits of the BAR information field may be used as an indicator indicating a full address, medium address, or short address. The number of bits used for identifying the station address may be determined based on information indicated by the indicator. When the station is not distinguished by a short address (e.g., when a plurality of stations having the same short address exist), a medium address may be used. When the station is not distinguished by a medium address (e.g., when a plurality of stations having the same medium address exist), a full address may be used.

Figure 20:
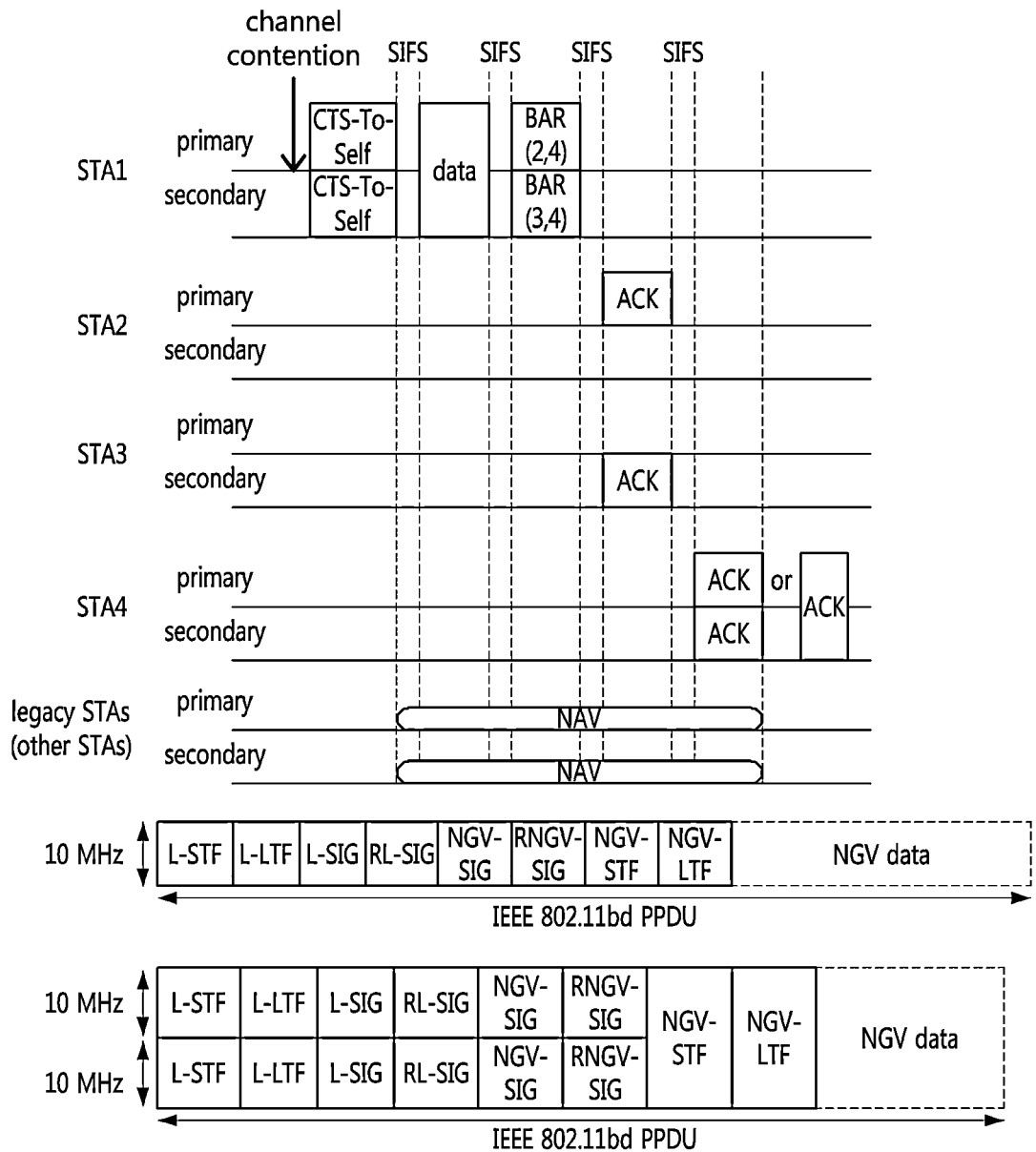
FIG. 20 is a timing diagram illustrating a first embodiment of a method for multiplexing ACKs in a wireless LAN system.

FIG. 20 is a timing diagram illustrating a first embodiment of a method for multiplexing ACKs in a wireless LAN system.

As shown in FIG. 20, a data frame may be transmitted using a channel having a 20 MHz bandwidth. In this case, ACKs for the data frame may be multiplexed in the frequency domain. For example, an ACK may be transmitted in a 10 MHz bandwidth of the 20 MHz bandwidth, and an ACK may be transmitted in the remaining 10 MHz bandwidth. Accordingly, the channel may be used efficiently.

Before transmission of the data frame, a CTS frame may be transmitted according to a CTS-to-Self scheme. The CTS frame may be transmitted in units of 10 MHz bandwidth. When a first subchannel (e.g., primary channel) having a 10 MHz bandwidth and a second subchannel (e.g., secondary channel) having a 10 MHz bandwidth are in an idle state, STA1 may transmit a CTS the first subchannel and the second subchannel Stations that do not participate in the OCB GCR operation (e.g., legacy STAs, other STAs) may set a NAV based on the received CTS frame.

STA1 may transmit a data frame after a SIFS elapses from a transmission time of the CTS frame and may transmit a BAR after a SIFS elapses from a transmission time of the data frame. One PPDU including the BAR may be transmitted through a 20 MHz bandwidth. Alternatively, the BAR may be multiplexed in the frequency domain. For example, a first PPDU including the BAR may be transmitted in a first subchannel (e.g., primary channel) having a 10 MHz bandwidth, and a second PPDU including the BAR may be transmitted in a second subchannel (e.g., secondary channel) having a 10 MHz bandwidth.

The BAR may include information indicating a subchannel (e.g., primary channel or secondary channel) to be used for ACK transmission. For example, the odd-numbered stations (e.g., STA2, STA4) among the stations participating in the OCB GCR operation may be configured to transmit ACKs in the primary channel. The even-numbered stations (e.g., STA3) among the stations participating in the OCB GCR operation may be configured to transmit ACKs in the secondary channel. If the last station (e.g., STA4) among the stations participating in the OCB GCR operation is an odd-numbered station, the last station may repeatedly transmit the same ACK in the secondary channel as well as the primary channel. Alternatively, if the last station is an odd-numbered station, the last station may transmit one ACK using a 20 MHz bandwidth.

When the BAR is multiplexed in units of 10 MHz bandwidth, the corresponding BAR may include information (e.g., ACK transmission order information) on an order of stations that will transmit ACKs in a subchannel through which the corresponding BAR is transmitted. When the last station is an odd-numbered station, two BARs may include information indicating the last station. For example, STA4 may be indicated by both the BAR transmitted in the primary channel and the BAR transmitted in the secondary channel. In this case, STA4 may transmit the ACK in the primary channel and the secondary channel.

Meanwhile, the above-described methods may be performed by a multi-link device (MLD). The primary channel and the secondary channel may mean different channels. Links may mean channels having different frequencies. The primary channel may mean a first link, and the secondary channel may mean a second link. One link may consist of a channel having a minimum bandwidth of 20 MHz. Each of STA1, STA2, STA3, and STA4 may be a MLD, and legacy STAs may not support multi-link operations.

The first link and the second link may be controlled by the same MLD. Since a frame can be transmitted through each link, it may be interpreted that a communication terminal for each link exists. Here, STA1 may be MLD1, STA2 may be MLD2, STA3 may be MLD3, and STA4 may be MLD4. A first communication terminal included in each MLD may perform communication using the primary channel (e.g., first link), and a second communication terminal included in each MLD may perform communication using the secondary channel (e.g., second link).

The MLD1 may perform a channel contention operation in the first link and the second link and may transmit a CTS frame according to the CTS-to-Self scheme. Here, the CTS frame may be transmitted simultaneously in the first link and the second link. The MLD1 may transmit a data frame using the first link and the second link after a SIFS elapses from a transmission time of the CTS frame. The data frame may include a plurality of MPDUs. Also, the data frame may include QoS data. In this case, a BA indicating a reception status of the data frame may be transmitted.

The MLD1 may transmit a BAR in the first link and the second link after a SIFS elapses from the transmission time of the data frame. The BAR transmitted in the first link may be used to request ACK (e.g., BA) transmission to MLD2 and MLD4. The BAR transmitted in the second link may be used to request ACK (e.g., BA) transmission to MLD3 and MLD4. MLD2 may receive the data frame in the first link and the second link and may receive the BAR in the first link. In this case, MLD2 may transmit an ACK (e.g., BA) for the data frame to MLD1 through the first link.

MLD3 may receive the data frame in the first link and the second link and may receive the BAR in the second link. In this case, MLD3 may transmit an ACK (e.g., BA) for the data frame to MLD1 through the second link. MLD4 may receive the data frame in the first link and the second link and may receive the BAR in the first link and the second link. In this case, MLD4 may transmit an ACK (e.g., BA) for the data frame to MLD1 through the first link and the second link. Here, the ACK transmitted in the first link may be the same as the ACK transmitted in the second link.

Figure 21:
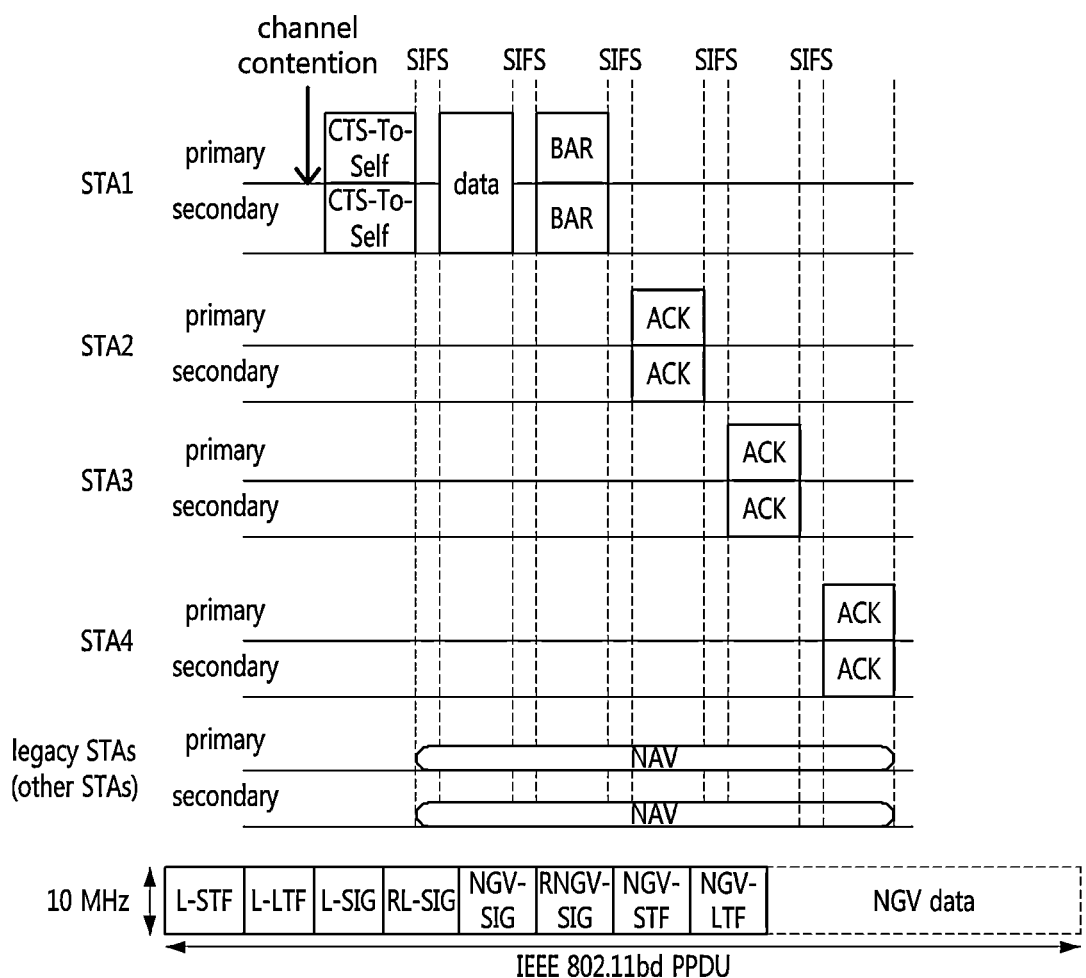
FIG. 21 is a timing diagram illustrating a second embodiment of a method for multiplexing ACKs in a wireless LAN system.

FIG. 21 is a timing diagram illustrating a second embodiment of a method for multiplexing ACKs in a wireless LAN system.

As shown in FIG. 21, in order to improve transmission reliability, a control frame may be repeatedly transmitted in units of 10 MHz bandwidth in the frequency domain. For example, each of the CTS frame, BAR, and ACK according to the CTS-to-Self scheme may be repeatedly transmitted in units of 10 MHz bandwidth in the frequency domain. When the station successfully receives the frame in one subchannel (e.g., primary channel or secondary channel) among subchannels each having a 10 MHz bandwidth, the station may perform decoding on the corresponding frame. Alternatively, when the station receives frames in subchannels each having a 10 MHz bandwidth, the station may perform decoding by combining the frames.

Figure 22:
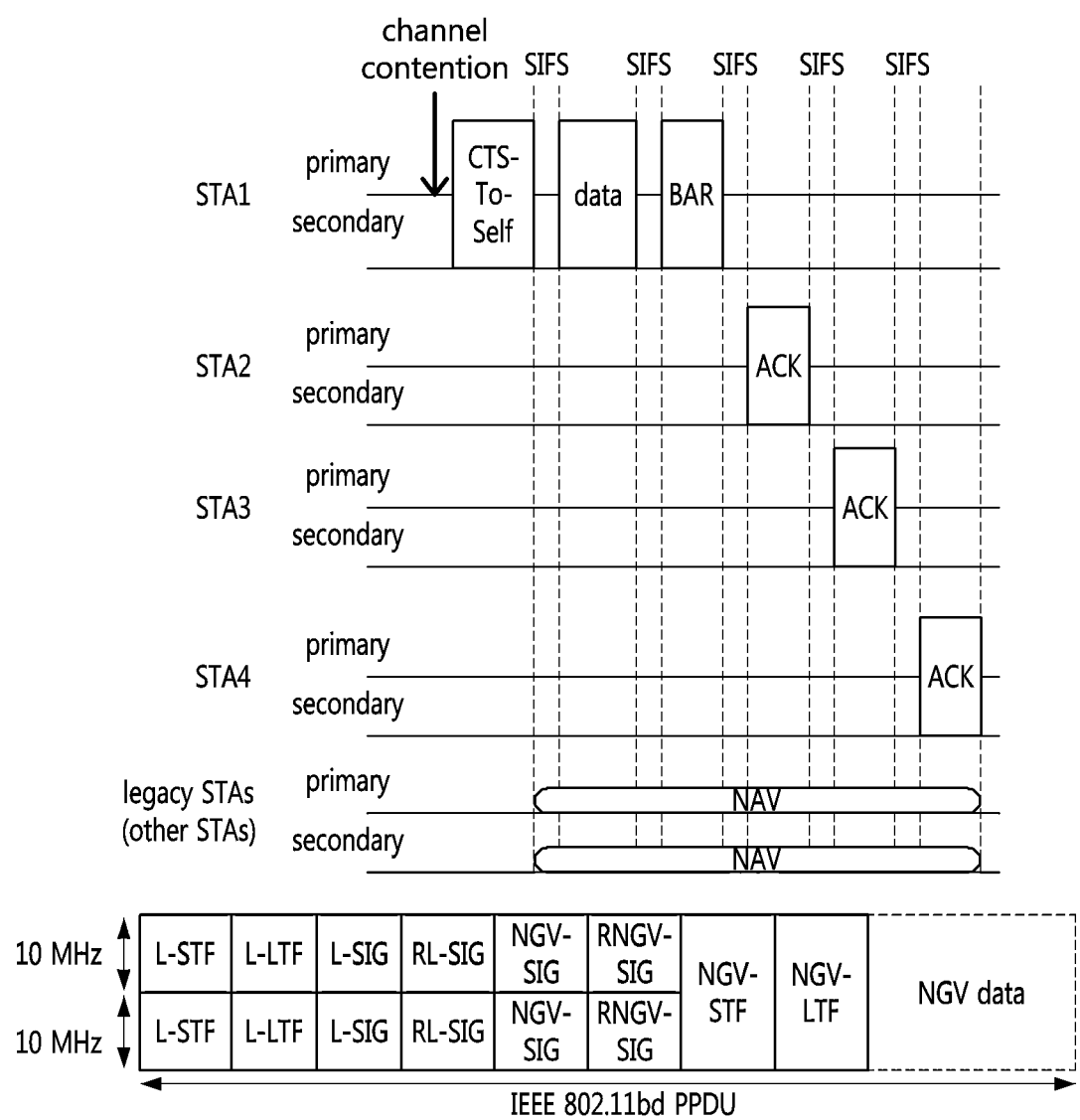
FIG. 22 is a timing diagram illustrating a first embodiment of an ACK transmission method in a wireless LAN system.

FIG. 22 is a timing diagram illustrating a first embodiment of an ACK transmission method in a wireless LAN system.

As shown in FIG. 22, each of a control frame (e.g., CTS frame, BAR, ACK) and a data frame may be transmitted in units of 20 MHz bandwidth. To reduce a required transmission time (e.g., to reduce an air time required for transmission), a 20 MHz bandwidth may be used for the transmission. The transmission time required when using the 20 MHz bandwidth may be smaller than a transmission time required when using the 10 MHz bandwidth.

In consideration of a relationship between communication reliability and transmission time, the embodiment shown in FIG. 21, the embodiment shown in FIG. 22, or a combination of the embodiments shown in FIG. 21 and FIG. 22 may be used. In the embodiments, a time corresponding to a NAV may be the same as a time corresponding to a TXOP. A station may share its acquired TXOP with other stations. In this case, other stations may transmit data in the shared TXOP. The above-described embodiments may be applied not only to a channel having a 10 MHz bandwidth but also to a channel having various bandwidths (e.g., 20 MHz bandwidth). Here, the channel may mean a link.

The embodiments of the present disclosure may be implemented as program instructions executable by a variety of computers and recorded on a computer-readable medium. The computer-readable medium may include a program instruction, a data file, a data structure, or a combination thereof. The program instructions recorded on the computer-readable medium may be designed and configured specifically for the present disclosure or can be publicly known and available to those who having ordinary skill in the field of computer software.

Examples of the computer-readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above hardware device can be configured to operate as at least one software module in order to perform the embodiments of the present disclosure, and vice versa.

While the embodiments of the present disclosure and their advantages have been described in detail, it should be understood that various changes, substitutions, and alterations may be made herein without departing from the scope of the present disclosure.

The invention claimed is:

1. An operation method of a first communication node in a wireless local area network (LAN) system, the operation method comprising:
   generating a first data frame including first add block acknowledgment (ADDBA) information;
   transmitting the first data frame to a second communication node;
   receiving, from the second communication node, a first block acknowledgment (BA) including second ADDBA information generated by the second communication node in response to the first data frame;
   transmitting, to the second communication node, a second data frame not including the first ADDBA information in a same BA session as the first data frame; and
   receiving, from the second communication node, a second BA not including the second ADDBA information in response to the second data frame,
   wherein a transmission/reception operation of the first data frame is performed without a BA agreement operation between the first communication node and the second communication node.

2. The operation method according to claim 1, wherein the first ADDBA information includes at least one of information indicating a BA timeout value, information indicating a buffer size, information indicating a fragment number, information indicating a starting sequence number, information of a sequence number bitmap, or a combination thereof.

3. The operation method according to claim 2, wherein the buffer size indicates a maximum number of medium access control (MAC) protocol data units (MPDUs) transmittable in a BA session started by the first data frame.

4. The operation method according to claim 1, wherein the second ADDBA information includes at least one of information indicating a BA timeout value, information indicating a buffer size, or a combination thereof.

5. The operation method according to claim 1, wherein the first data frame includes one or more MPDUs, and a number of the one or more MPDUs is determined in consideration of a buffer size of the second communication node.

6. The operation method according to claim 1, wherein when the first data frame includes a plurality of MPDUs, the first ADDBA information is included in a first MPDU among the plurality of MPDUs.

7. The operation method according to claim 1, further comprising receiving, from the second communication node, a frame including information indicating a buffer size of the second communication node before transmitting the first data frame, wherein a number of one or more MPDUs included in the first data frame is determined based on the buffer size.

8. The operation method according to claim 1, wherein a number of one or more MPDUs included in the second data frame is determined based on a buffer size determined through exchanging of the first data frame and the first BA.

9. An operation method of a second communication node in a wireless local area network (LAN) system, the operation method comprising:
   receiving, from a first communication node, a first data frame including first add block acknowledgment (ADDBA) information;
   generating second ADDBA information in consideration of the first ADDBA information;
   transmitting, to the first communication node, a block acknowledgment (BA) including the second ADDBA information in response to the first data frame;
   receiving, from the first communication node, a second data frame not including the first ADDBA information in a same BA session as the first data frame; and
   transmitting, to the first communication node, a second BA not including the second ADDBA information in response to the second data frame,
   wherein a transmission/reception operation of the first data frame is performed without a BA agreement operation between the first communication node and the second communication node.

10. The operation method according to claim 9, wherein the first ADDBA information includes at least one of information indicating a BA timeout value, information indicating a buffer size, information indicating a fragment number, information indicating a starting sequence number, information of a sequence number bitmap, or a combination thereof.

11. The operation method according to claim 9, wherein the second ADDBA information includes at least one of information indicating a BA timeout value, information indicating a buffer size, or a combination thereof.

12. The operation method according to claim 9, wherein the first data frame includes one or more medium access control (MAC) protocol data units (MPDUs), a number of the one or more MPDUs is determined in consideration of a buffer size of the second communication node, and the first ADDBA information is included in a first MPDU among the plurality of MPDUs.

13. The operation method according to claim 9, further comprising transmitting a frame including information indicating a buffer size of the second communication node before receiving the first data frame, wherein a number of one or more MPDUs included in the first data frame is determined based on the buffer size.

14. A first communication node in a wireless local area network (LAN) system, the first communication node comprising:
   a processor; and
   a memory storing one or more instructions executable by the processor;

wherein the one or more instructions are executed to:
generate a first data frame including first add block acknowledgment (ADDBA) information;
transmit the first data frame to a second communication node;
receive, from the second communication node, a first block acknowledgment (BA) including second ADDBA information generated by the second communication node in response to the first data frame;
transmit, to the second communication node, a second data frame not including the first ADDBA information in a same BA session as the first data frame; and
receive, from the second communication node, a second BA not including the second ADDBA information in response to the second data frame,
wherein a transmission/reception operation of the first data frame is performed without a BA agreement operation between the first communication node and the second communication node.

15. The first communication node according to claim 14, wherein the first data frame includes one or more medium access control (MAC) protocol data units (MPDUs), a number of the one or more MPDUs is determined in consideration of a buffer size of the second communication node, and the first ADDBA information is included in a first MPDU among the one or more MPDUs.

16. The first communication node according to claim 14, wherein the one or more instructions are further executed to receive, from the second communication node, a frame including information indicating a buffer size of the second communication node before transmitting the first data frame, wherein a number of one or more MPDUs included in the first data frame is determined based on the buffer size.

17. The first communication node according to claim 14, wherein a number of one or more MPDUs included in the second data frame is determined based on a buffer size determined through exchanging of the first data frame and the first BA.

* * * * *